(12) United States Patent  (10) Patent No.: US 7,451,619 B2
Kuniyoshi et al.  (45) Date of Patent: Nov. 18, 2008

(54) ORGANIC-INORGANIC HYBRID GLASSY MATERIALS AND THEIR PRODUCTION PROCESSES

(75) Inventors: Minoru Kuniyoshi, Kyoto (JP); Toshinobu Yoko, Kyoto (JP); Masahide Takahashi, Kyoto (JP)

(73) Assignee: Central Glass Company, Limited, Ube-shi (JP)

( * ) Notice: Subject to any disclaimer, the term of this patent is extended or adjusted under 35 U.S.C. 154(b) by 276 days.

(21) Appl. No.: 10/875,617

(22) Filed: Jun. 25, 2004

(65) Prior Publication Data

US 2005/0132748 A1  Jun. 23, 2005

(30) Foreign Application Priority Data

| Jun. 26, 2003 | (JP) | ............................. 2003-182943 |
| Nov. 19, 2003 | (JP) | ............................. 2003-389800 |
| Feb. 27, 2004 | (JP) | ............................. 2004-053651 |
| Mar. 31, 2004 | (JP) | ............................. 2004-104455 |
| Mar. 31, 2004 | (JP) | ............................. 2004-104456 |

(51) Int. Cl.
*C03B 8/00* (2006.01)

(52) U.S. Cl. ....................................................... 65/17.2

(58) Field of Classification Search ................... 65/395, 65/440, 17.2, 901; 423/333–339
See application file for complete search history.

(56) References Cited

U.S. PATENT DOCUMENTS

| 3,791,808 | A | 2/1974 | Thomas |
| 7,006,745 | B2* | 2/2006 | Etienne ....................... 385/129 |
| 2003/0005723 | A1* | 1/2003 | Kawabe et al. ............... 65/17.2 |
| 2005/0027083 | A1* | 2/2005 | Kuniyoshi et al. .......... 525/474 |

FOREIGN PATENT DOCUMENTS

| JP | 59-97550 | | 6/1984 |
| JP | 62-223323 | A | 10/1987 |
| JP | 62-297236 | A | 12/1987 |
| JP | 1183438 | A | 7/1989 |
| JP | 126035 | A | 5/1995 |
| JP | 7-277760 | | 10/1995 |

(Continued)

OTHER PUBLICATIONS

English abstract of JP 60226418, Mizugaki et al. Preparation of Quartz Glass Mass, Nov. 11, 1985.*

(Continued)

*Primary Examiner*—Steven P. Griffin
*Assistant Examiner*—Queenie Dehghan
(74) *Attorney, Agent, or Firm*—Crowell & Moring LLP

(57) ABSTRACT

In the production of an organic-inorganic hybrid glassy material using raw materials which are used in a sol-gel process as starting materials, the present invention relates to a process for producing an organic-inorganic hybrid glassy material, which is characterized in that, there is a heating reaction step between a mixing step and a melting step of the starting materials and there is further an aging step after the melting step. In accordance with the present invention, an organic-inorganic hybrid glassy material satisfying both heat resistance as well as airtight property and low-melting characteristic, which has been believed to be very difficult to produce, is now able to be produced in a very shorter period than before.

9 Claims, 4 Drawing Sheets

FOREIGN PATENT DOCUMENTS

| | | |
|---|---|---|
| JP | 7309629 A | 11/1995 |
| JP | 8-165114 | 6/1996 |
| JP | 2002-512293 | 4/2002 |
| JP | 2003-95690 | 4/2003 |
| JP | 2003-095690 A | 4/2003 |
| JP | 2003-313048 | 11/2003 |
| JP | 2003-313300 | 11/2003 |
| JP | 2004-43242 | 2/2004 |
| JP | 2004-043242 A | 2/2004 |
| WO | WO 2004/026943 | 4/2004 |

OTHER PUBLICATIONS

An article by P.A. Tick, Physics and Chemistry of Glasses, vol. 25, No. 6, pp. 149-154 (1984).
An article by Kamiya et al, Yogyo-Kyokai-Shi 84 [12] pp. 614-618 (1976).
An article by A. Matsuda, Ceramics, 893-895, 38 (2003).
An article by Takahashi et al, New Glass, pp. 8-13, 17 (2002).
Korean and Japanese Office Action (Six (6) pages), Aug. 28, 2006.

\* cited by examiner

ORGANIC-INORGANIC HYBRID GLASSY MATERIALS AND THEIR PRODUCTION PROCESSES

BACKGROUND OF THE INVENTION

The present invention relates to an organic-inorganic hybrid glassy material where raw materials used in a sol-gel process are starting materials and also to processes for producing the same.

With regard to materials which soften at not higher than 600° C., macromolecular materials, low-melting glass, etc. have been famous and, for a long time, they have been used in many areas such as sealing and encapsulating materials, passivation glass, glaze, etc. Since their physical properties are different between macromolecular materials and low-melting glass, they have been used differently depending upon the environment in which they are used. In general, in case that heat resistance and airtight property have a priority, glass has been used while, in the field where characteristics other than heat resistance and airtight property have a priority, organic materials represented by macromolecular materials have been used. However, as a result of recent progress in the art, characteristics which have not been demanded up to now have received attention and development of materials having such characteristics has been expected.

In view of the above, development for macromolecular materials where heat resistance and airtight property are enhanced and glass where a softening temperature region is made low or the so-called low-melting glass has been briskly carried out. Particularly in the market of electronic materials where heat resistance and airtight property are demanded, low-melting glass represented by a PbO—$SiO_2$—$B_2O_3$ type or a PbO—$P_2O_5$—$SnF_2$ has been a material which is indispensable in the field of sealing, coating, etc. of electronic parts. In addition, energy required for molding process or, in other words, the cost can be reduced in low-melting glass as compared with high-melting glass and, therefore, that meets the recent social demand for conservation of energy. Further, when it can be melted at the temperature at which an organic material having optical function property is not destructed, its application as a host for (non-linear) optical material containing an optically functioning organic material to optical information communication devices such as optical switch is expected. As such, there has been a demand in many fields for materials having heat resistance and airtight property which are characteristics of common melted glass and also being apt to have various characteristics as in the case of macromolecular materials and, especially, the expectation is concentrated to a low-melting glass. Furthermore, an organic-inorganic hybrid glass has been also receiving public attention as one of the low-melting glass.

With regard to the low-melting glass, Tick glass represented by glass of an Sn—Pb—P—F—O type (refer, for example, to Non-Patent Document 1) is famous for example and, since it has a glass transition point at around 100° C. and also has an excellent water resistance, it has been used in some of the market. However, in this low-melting glass, lead is contained in its main constituting components, there has been a necessity to substitute with other materials due to the recent trend of protection of environment. In addition, demanded characteristic to a low-melting glass represented by Tick glass has been greatly changed and, at the same time, the demand as such has been diversified as well.

With regard to a common method for the production of glass, a fusion method and a low-temperature synthetic method have been known. Fusion method is a method where glass materials are directly heated to melt and make them into glass. Many kinds of glass are produced by this method and a low-melting glass is also produced by this method. In the case of a low-melting glass, however, there are many restrictions for glass composition which can be constituted such as that the containment of lead, alkali, bismuth, etc. is necessary for lowering its melting point.

On the other hand, with regard to a low-temperature synthetic method for noncrystalline bulks, there are sol-gel process, liquid-phase reaction method and anhydrous acid-base reaction method. In a sol-gel process, a metal alkoxide or the like is subjected to a hydrolysis-polycondensation and subjected to a thermal treatment at the temperature of higher than 500° C. (refer, for example, to Non-Patent Document 2), usually at 70 to 1,600° C., whereby a bulk is able to be produced. However, when the bulk produced by a sol-gel process is checked as a material for practical use, there are many cases where the product is porous due to decomposition and burning of organic materials such as alcohol which are introduced in the preparation of the starting solution or evaporation and release, etc. of decomposition gas of organic materials or heating process of water, there is a problem in terms of heat resistance and airtight property. As such, in the production of bulk by a sol-gel process, many problems have been still left unsolved and, particularly, production of low-melting glass by a sol-gel process has not been carried out. Incidentally, it has been also attempted to produce a microlens by pressing a gel film of an organic-inorganic hybrid glass by a sol-gel process coated on a substrate (refer to Non-Patent Document 3).

A liquid-phase reaction method has a low productivity because of its low yield and, in addition, it uses hydrofluoric acid or the like in its reaction system and is limited for the synthesis of a thin film at best. Accordingly, it is almost impossible to use as a practical means for the synthesis of bulks.

An anhydrous acid-base reaction method is a means which has been developed recently and, although it is able to produce an organic-inorganic hybrid glass which is one of the low-melting glasses (refer, for example, to Non-Patent Document 4), it is still in a stage of development and all kinds of low-melting glasses cannot be produced by that.

Accordingly, the production of many kinds of low-melting glasses has been carried out not by a low-temperature synthetic method but by a fusion method. Therefore, due to fusion of glass materials, the glass composition thereof is limited and, with regard to a low-melting glass which can be produced, the type thereof has been very limited.

Incidentally, at present, a low-melting glass is prominent as a material in view of heat resistance and airtight property and it is often that the required physical property is demanded in a form of being represented by the low-melting glass. However, the material is not limited to a low-melting glass but, if the required physical property is satisfied, there is no large problem in low-melting or low-softening material other than glass.

In the publicly known art, there have been disclosed a process for production of quartz glass fibers by a sol-gel process (refer, for example, to Patent Document 1), a process for production of titanium oxide fibers by a sol-gel process (refer, for example, to Patent Document 2) and a process for production of a semiconductor doped matrix by a sol-gel process (refer, for example, to Patent Document 3). There has been also disclosed a low-melting glass of a $P_2O_5$—$TeO_2$—$ZnF_2$ type by a fusion method (refer, for example, to Patent Document 4).

[Patent Document 1] JP-A-62-297236
[Patent Document 2] JP-A-62-223323
[Patent Document 3] JP-A-1-183438
[Patent Document 4] JP-A-7-126035
[Non-Patent Document 1] P. A. Tick, *Physics and Chemistry of Glasses*, Vol. 25, No. 6, pp. 149-154 (1984).
[Non-Patent Document 2] K. Kamiya, S. Sakka and N. Tashiro, Yogyo Kyokaishi, 614-618, 84 (1976).
[Non-Patent Document 3] Atsunori Matsuda, *Ceramics*, 893-895, 38 (2003)
[Non-Patent Document 4] M. Takahashi, H. Niida and T. Yokoo, New Glass, 8-13, 17 (2002)

The production of many low-softening materials, particularly low-melting glasses, has been carried out by a fusion method. Therefore, there are many restrictions for their glass compositions and, in view of melting materials for the glass, a low-melting glass which can be produced is very limited.

On the other hand, when the production is carried out by a sol-gel process which is a low-temperature synthetic method, a treatment temperature of not lower than 500° C. is necessary for making the product dense but, when the treatment is conducted at such temperature, a low-melting glass is not produced. Therefore, as a result, it has not been possible to produce a low-melting glass having good heat resistance and good airtight property. Particularly in the field of electronic materials, there has been no low-melting glass which copes with severe heat resistance and airtight property and with the production of low-melting ones. In addition, no low-melting material other than glass satisfying heat resistance and airtight property has been found yet.

The methods which are disclosed in JP-A-62-297236, JP-A-62-223323 and JP-A-1-183438 have achievements that the production of materials which were able to produce only by high-temperature fusion is made possible even at low temperature but they are unable to produce a low-melting glass. It is also necessary to treat at not lower than 500° C. after the sol-gel treatment. On the other hand, in a method of JP-A-7-126035, it is disclosed that glass where glass having a transition point of three hundred and several tens degrees centigrade can be produced. However, there has been no example up to now for the production of a glass having a transition point lower than that without a material for making the melting point low such as lead and bismuth.

Thus, according to processes for production of low-melting glass up to now, it was not possible to produce a glass which satisfied both severe heat resistance as well as airtight property and low-melting characteristic. In addition, even in materials other than glass, there has been nothing to satisfy such characteristics.

SUMMARY OF THE INVENTION

An object of the present invention is to provide an organic-inorganic hybrid glassy material which satisfies heat resistance as well as airtight property and low-melting characteristic.

Another object of the present invention is to provide a process where such an organic-inorganic hybrid glassy material is produced within a short period of time.

According to the first characteristic of the present invention, in the production of an organic-inorganic hybrid glassy material using materials which are used in a sol-gel process as starting materials, there is provided a process (the first process) for production of an organic-inorganic hybrid glassy material where there is a heating reaction step between a mixing step of starting materials and a melting step and there is further an aging step after a melting step.

According to the second characteristic of the present invention, there is provided a process (the second process) for production of an organic-inorganic hybrid glassy material, characterized in that, a metal alkoxide and a compound comprising a divalent metal M (at least one member selected from Mg, Ca, Sr, Ba and Sn) are used as raw materials and subjected to a heating reaction at the temperature of 40° C. to 100° C. for 30 minutes to 10 hours to produce a material containing at least one member of a material represented by MO—RSiO$_{3/2}$ or MO—R$_2$SiO (R: organic functional group; M: divalent metal) (the second method).

According to the third characteristic of the present invention, in the production of an organic-inorganic hybrid glassy material having a melting property, there is provided a process for production of an organic-inorganic hybrid glassy material, characterized in that, at least two kinds of metal alkoxides are used as raw materials and a D unit is added so that the ratio of the D unit to (D unit+T$^3$ unit+T$^2$ unit+T$^1$ unit) is adjusted to 0.05-0.50.

Here, D unit means one under a state where, in four bonds of a silicon atom, either all two or one thereof excluding the bonds with two organic substituents are/is bonded to a silicon atom via an oxygen atom; T$^3$ unit means one under a state where, in four bonds of a silicon atom, all three thereof excluding the bond with one organic substituent are bonded to silicon atoms via oxygen atoms; T$^2$ unit means one under a state where, in four bonds of a silicon atom, two of the three thereof excluding the bond with one organic substituent are bonded to silicon atoms via oxygen atoms; and T$^1$ unit means one under a state where, in four bonds of a silicon atom, one of the three thereof excluding the bond with one organic substituent is bonded to a silicon atom via an oxygen atom.

According to the fourth characteristic of the present invention, there is provided an organic-inorganic hybrid glassy material where ultraviolet ray and visible light are transmittable, characterized in that, at a thickness of 3 mm, transmittance at 630 nm wavelength is not less than 80%, transmittance at 470 nm wavelength is not less than 80% and transmittance at 294 nm is not less than 50%.

DETAILED DESCRIPTION

Figure 1:
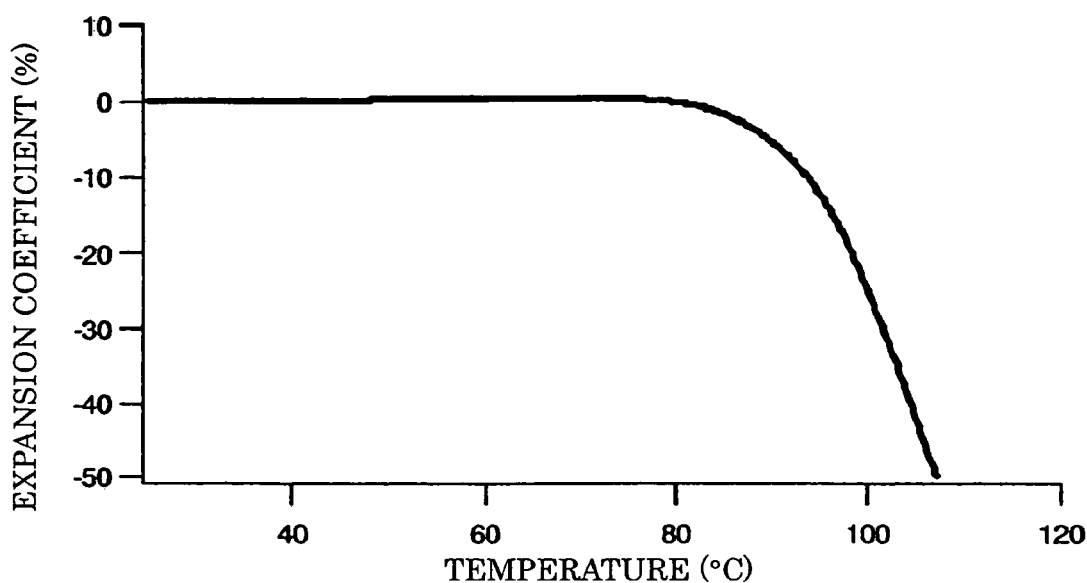
FIG. 1 shows the data of measurement of softening temperature (the result of TMA measurement) as shown in Example 1-1 of the present invention.

In the following, the contents which are common to the first to the fourth characteristics of the present invention will be described.

According to the present invention, an organic-inorganic hybrid glassy material simultaneously satisfying heat resistance, airtight property and low-melting characteristic which has been very difficult to be prepared is now able to be prepared within a very shorter period of time than before.

The organic-inorganic hybrid glassy material of the present invention is able to be applied to the field where low-melting glass such as material for sealing and coating for display parts including PDP, material for optical information communication devices including optical switch and optical connector, materials for optical instruments including LED chips, photofunctional (nonlinear) optical material and adhesive material is used and to the field where organic material such as epoxy is used.

A process for production of the organic-inorganic hybrid glassy material of the present invention is fundamentally different from the conventional method which is called sol-gel process and also from a new process including fusion and aging proposed by the present applicants. In the conventional sol-gel process, several kinds of sol-gel materials are mixed, stirred at room temperature for several hours and allowed to stand still at room temperature for 2 days to one week to give a wet gel. After that, the wet gel is dried at room temperature to about 100° C. for several hours to three days to give a dry gel. It is pulverized, washed and filtered if necessary and sintered at 500° C. or higher or, usually, at 800° C. or higher to turn it into a bulk or fibrous form. In the case of film, the wet gel is made into a form of thin film followed by drying and sintering to obtain a thin film.

Further, in the new process proposed by the present inventors, several kinds of sol-gel materials are mixed and gelled by stirring at room temperature for 1 to 3 day(s) and the gel is dried and subjected to a melting step and an aging step to give a predetermined glassy material. In this case, a step of sintering is not necessary and, therefore, a treatment at the temperature of as high as 500° C. at the lowest or, usually, not lower than 800° C. is not required. In this method, attention is paid to the new characteristic of melting property of a dry gel and glass change (glass stabilization) by aging which have not been noted at all whereby it is possible to prepare a new material which has not been prepared by the conventional sol-gel process. Thus, although it is possible in the conventional sol-gel process to prepare sintered glass or thin glass film, it is difficult to prepare a thick film and a bulky glass.

In contrast with this, in the present invention, a heating reaction step is carried out after mixing of sol-gel materials whereby it is now possible to give starting materials which do not require a gelation step but are able to be melted directly. In other words, a sol is directly prepared from a mixing step and, as a result of concentration of the sol, a fusion is now directly carried out. Such point that gelation is not done and that the melted liquid is directly melted are greatly different from the conventional sol-gel process and also from a new process accompanied by fusion and aging of a dry gel. In addition, time required for such a heating reaction step is about 30 minutes to five hours and, therefore, there is a characteristic in terms of production that the treatment time is greatly different from the conventional sol-gel process or the above-mentioned new process where one to three day(s) is/are needed for gelation and there is also another characteristic in terms of such a difference in the product that, even when a similar sol-gel material is used, an organic-inorganic hybrid glassy material having a lower softening point is able to be prepared. Incidentally, in the process of the present invention, after this heating reaction step, it is possible to directly conduct a melting step or it is also possible to conduct a melting step after cooling. It is further possible to conduct a heating reaction step after a mixing step when they are conducted under an appropriate condition.

It is also a characteristic feature of the present invention that there is an aging step after the above-mentioned melting step. However, the aging according to the present invention is entirely different from an aging in the conventional sol-gel processes. Thus, the aging does not mean a standing still for preparing a wet gel by spending 2 days to one week, but means an operation where the structure of an organic-inorganic hybrid glass after fusion is changed, thereby stabilizing the glassy material. In a sol-gel process which has conventionally been conducted, there is none of the above-mentioned melting step but dry gel is directly sintered and, therefore, there is no aging step after that. This aging step is quite important and, even in a glassy material having a melting property, it is not possible to prepare a desired organic-inorganic hybrid glassy material unless an aging step thereafter is conducted. When merely melted, there remain reactive hydroxyl groups (—OH) in the system and, even when this is solidified by cooling, the residual hydroxyl groups (—OH) causes a hydrolysis-dehydration condensation whereby cracks are resulted or destruction takes place and it is not possible to prepare a good organic-inorganic hybrid glassy material. Therefore, it is a quite important step to stabilize the reactive hydroxyl groups (—OH) in a glassy material by means of aging. This is the point where the present invention is greatly different from the conventional sol-gel processes.

The starting material is a metal alkoxide, metal acetyl acetonate, metal carboxylate, metal hydroxide or metal halide and it is preferable that a sol is firstly prepared in a way similar to the sol-gel process. With regard to the starting material, there is no problem even when it is a material other than the above-mentioned ones provided that it is a material which is used in the sol-gel processes and is not limited to the above-mentioned starting materials. It is to be noted, however, that the preparation of this sol is the important first step.

In the mixing step, it is preferable to use a catalyst. With regard to these catalysts, although there is no problem in alkaline catalyst and acid catalyst, which have been used in the conventional sol-gel processes, ammonia is more preferable as an alkaline catalyst while hydrochloric acid or acetic acid is more preferable as an acid catalyst.

Incidentally, it is preferable that the starting material has a metal unit having an organic functional group. When there is no metal unit, although sintering takes place, no fusion takes place. The metal unit has a characteristic of having an organic functional group R and its example is a silicon unit represented by $(R_nSiO_{(4-n)/2})$ (n=1 to 3). Here n is a natural number and is selected from 1, 2 and 3. To be more specific, it is more preferable to have a metal unit of phenyl group $(Ph_nSiO_{(4-n)/2})$. A combination with a metal unit of methyl group $(Me_nSiO_{(4-n)/2})$, a metal unit of ethyl group $(Et_nSiO_{(4-n)/2})$, a metal unit of butyl group $(Bt_nSiO_{(4-n)/2})$ (n=1 to 3), etc. is also effective.

With regard to the organic functional group R, aryl group and alkyl group are representative ones. Examples of the aryl group are phenyl group, pyridyl group, tolyl group and xylyl group and particularly preferable one is phenyl group. Examples of the alkyl group are methyl group, ethyl group, propyl group (n- and i-), butyl group (n-, i- and t-), pentyl group and hexyl group (carbon number: 1 to 20) and particularly preferable ones are methyl group and ethyl group. Needless to say, the organic functional group is not limited to the above-mentioned alkyl groups and aryl groups. The alkyl group may be either a straight-chain type or a branched type and it may be a cyclic type as well. In view of the above, it is preferable to use at least one kind of sol-gel material containing a phenyl group.

When there is a heating reaction step before conducting a melting step, in other words, between a mixing step of the starting materials and a melting step by heating, it is preferable that the heating reaction step is conducted at a temperature of 40° C. to 100° C. Out of this temperature range, it is not possible to appropriately contain a metal unit having an organic functional group R in the structure, such as a silicon unit represented by $(R_nSiO_{(4-n)/2})$ (n is selected from 1, 2 and 3), and, to be more specific, a metal unit of phenyl group $(Ph_nSiO_{(4-n)/2})$, a metal unit of methyl group $(Me_nSiO_{(4-n)/2})$, a metal unit of ethyl group $(Et_nSiO_{(4-n)/2})$, a metal unit of butyl group $(Bt_nSiO_{(4-n)/2})$ (n=1 to 3), etc. and, therefore, it is very difficult to prepare an organic-inorganic hybrid glassy material which is able to achieve a glass fusion.

Incidentally, the upper limit temperature for the heating reaction step is 100° C. or lower when an alcohol having a boiling point of higher than 100° C. such as 1-butanol having a boiling point of 118° C. is used, and, in the case of an alcohol having a boiling point of not higher than 100° C., it is desirable that the boiling point is also taken into consideration. When, for example, ethanol is used, there is a tendency that a better result is achieved when the temperature is made not higher than 80° C., which is its boiling point. That is likely due to the reason that, when the temperature is higher than the boiling point, alcohol is suddenly evaporated whereby a homogeneous reaction is hardly achieved due to the changes of alcohol in amount and state. Incidentally, the heating reaction step may be carried out either in an open system or under a reflux condition.

As a result of conducting the heating reaction step, the melting step and the aging step, it is possible to obtain a stabilized organic-inorganic hybrid glassy material. Since there is not the above-mentioned melting step in the conventional sol-gel processes, it goes without saying that there is no aging step after that. Incidentally, it is still possible to obtain an organic-inorganic hybrid glassy material by the heating reaction step and the melting step without forming a gel material. However, a more stable organic-inorganic hybrid glassy material can be prepared when the aging step thereafter is carried out, and therefore it is preferable to conduct the aging step.

It is preferable that, in the aging step, the treatment is conducted at a temperature of 30° C. to 400° C. At a temperature of lower than 30° C., the aging is substantially impossible. When the temperature is higher than 400° C., a thermal decomposition may take place and it is difficult to obtain a stable glassy material. It is preferably from 100° C. to 300° C. When the temperature for aging is lower than the lower limit of the melting temperature, the resulting effect becomes very small. Generally, it is desirable to be around from the lower limit of melting temperature to "the lower limit of melting temperature +150° C.". Furthermore, it is necessary that the time required for the aging is 5 minutes or longer. Although the aging time varies depending upon the treatment amount, the treatment temperature and the allowable residual amount of reactive hydroxyl groups (—OH), it is generally very difficult to achieve a satisfactory level when the time is shorter than 5 minutes. On the other hand, the productivity lowers when it is too long. Accordingly, it is preferably from 10 minutes to one week. Incidentally, in the case of conducting the aging, it may be divided into the first aging conducted at a temperature of 40° C. to 230° C. under a pressure of not higher than 0.1 Torr and the second aging conducted under atmospheric pressure at 70° C. to 350° C.

In the melting step by heating or in the aging step, there is a tendency that time can be shortened when it is conducted in an inert atmosphere or under reduced pressure and that is effective. Heating by microwave and ultrasonic wave is also effective for shortening the time and that is often effective for the improvement in mechanical characteristics such as strength and hardness and in electric characteristics such as dielectric constant as well. The heating reaction step, the melting step and the aging step may also be carried out continuously.

As a result of conducting the heating reaction step, the melting step and the aging step, it is now possible to prepare a stabilized organic-inorganic hybrid glassy material. Since there is not the above-mentioned melting step in the conventional sol-gel processes, it goes without saying that there is no aging step after that. Incidentally, it is still possible to prepare an organic-inorganic hybrid glassy material by the heating reaction step and the melting step without forming a gel material. However, a more stable organic-inorganic hybrid glassy material can be prepared when the aging step thereafter is carried out, and therefore it is preferable to conduct the aging step.

When the melted liquid after the melting step is separated into two layers, it is preferable that the supernatant solution is discarded and the melted liquid of the lower layer is extracted and aged. The method of the present invention has a great characteristic in melting, and it is often noted that the melted liquid after the melting step is in a state of separated two layers. In that case, it is possible to prepare an organic-inorganic hybrid glassy material having stabilized physical properties when a so-called supernatant solution, which is on the upper side of the two layers, is discarded and the melted liquid of the lower side is extracted and aged. As a result of adopting this method, an organic-inorganic hybrid glassy material having a low softening temperature is usually obtained. Even when separated into two layers, although it is still possible to age as it is, optical characteristics such as light transmittance tend to be somewhat low in that case.

Although it goes without saying that all of organic-inorganic hybrid glassy materials produced by the above-mentioned method are the object of the present invention, a preferable one is an organic-inorganic hybrid glassy material having a random network structure either partially or wholly.

It is preferable that the softening temperature is 500° C. or lower. When the softening temperature is higher than 500° C., an organic group bonded to a metal element, which forms a network upon fusion, burns, and therefore a desired organic-inorganic hybrid glassy material is not obtained, and in addition the product is disintegrated or forms bubbles, resulting in non-transparency. It is more preferably from 50° C. to 350° C., still more preferably from 60° C. to 300° C. It is much preferable if the softening temperature before aging is 60 to 150° C. and the softening temperature after aging is 100 to 300° C.

Further, it is preferable that phenyl group is contained therein. That is because an organic-inorganic hybrid glassy material containing phenyl group is often within the above-mentioned temperature range and is also much stabilized. That is further because an organic-inorganic hybrid glassy material containing phenyl group often has a melting property whereby the control for aging therefor is possible.

In the first characteristic of the present invention, it is preferable that the melting step by heating is conducted at a temperature of 40° C. to 500° C. At a temperature of lower than 40° C., fusion is substantially impossible. When it is higher than 500° C., an organic group bonded to a metal element, which forms a network, burns, and therefore a desired organic-inorganic hybrid glassy material is not obtained, and in addition disintegration takes place or bubbles are formed to give non-transparency. Preferably, it is from 100° C. to 300° C.

The second characteristic of the present invention will be described in detail as hereunder.

The raw materials in the above second characteristic are those which are used in a sol-gel process, and, when the heating reaction step is conducted after the mixing step, it is now possible to omit a conventional step by which gelation was conducted for 1 to 3 day(s). It is preferable to conduct the heating treatment at a temperature of 40° C. to 100° C. for 30 minutes to 10 hours. Under a condition other than this heating condition, it is difficult that the metal unit having an organic functional group R, i.e., a material represented by MO—RSiO$_{3/2}$ or MO—R$_2$SiO (R: organic functional group; M: divalent metal) is efficiently contained in the structure. There is also a case where a material which contains a material represented by R$_n$SiO$_{(4-n)/2}$ (R: organic functional group; n: 1 to 3) is produced. These glass types are very important, and, as a result of the presence of materials of these glass types, it is now possible to satisfy the characteristics of heat resistance as well as airtightness property and low melting point, which are very difficult to be compatible.

It is preferable to conduct the melting step by heating at a temperature of 30° C. to 400° C. At a temperature of lower than 30° C., fusion is substantially impossible. When it is higher than 400° C., an organic group bonded to a metal element, which forms a network, burns, and therefore a desired organic-inorganic hybrid glassy material is not obtained, and in addition disintegration takes place or bubbles are formed to give non-transparency. Preferably, it is 100° C. to 300° C. The contents of this paragraph are applicable not only to the second characteristic of the present invention but also to the third and fourth characteristics of the present invention.

The organic functional group R in MO—RSiO$_{3/2}$ or MO—R$_2$SiO may be the same as the organic functional group R in the above-mentioned metal unit. All of the above explanations for the latter (R) are effective as the explanation for the former (R) as well.

Furthermore, it is also possible to change the physical properties and the coloration of the above-mentioned organic-inorganic hybrid glassy material. For example, when an oxide of Nb, Zr, Ti, etc. is introduced as a raw material, it is possible to produce an organic-inorganic hybrid glassy material where glass properties such as water resistance are improved. When a compound of transition metal such as V, Cr, Mn, Fe, Co, Ni, Cu, Zn, etc. is introduced, it is also possible to produce an organic-inorganic hybrid glassy material where various properties are changed. It is further possible to produce an organic-inorganic hybrid glassy material which is colored or emit fluorescence by containing a compound of rare earth element (Ce, Pr, Nd, Pm, Sm, Eu, Gd, Tb, Dy, Ho, Er, Tm, Yb, etc.) or an organic dye in the raw material. It goes without saying that the contents of this paragraph can be applied not only to the second characteristic of the present invention but also to the first, third and fourth characteristics thereof.

It is an organic-inorganic hybrid glassy material prepared by the above-mentioned method. In other words, it is an organic-inorganic hybrid glassy material which is prepared by such a process that materials used in the conventional sol-gel processes are used as the starting materials, that there is a heating reaction step between a mixing step and a melting step of the starting materials and that there is an aging step after the melting step. It is preferable that this organic-inorganic hybrid glassy material contains at least one material represented by R$_n$SiO$_{(4-n)/2}$ (R: organic functional group; n: 1 to 3) and has a melting property. That is because both heat resistance as well as airtight property and low-melting property can be satisfied as a result of having at least one material represented by R$_n$SiO$_{(4-n)/2}$ (R: organic functional group; n: 1 to 3) and having a melting property.

It is preferably an organic-inorganic hybrid glassy material that contains a material represented by MO—RSiO$_{3/2}$ or MO—R$_2$SiO (R: organic functional group; M: divalent metal) where M is at least one member selected from Mg, Ca, Sr, Ba and Sn and that has a melting property. It is important to contain a material represented by MO—RSiO$_{3/2}$ or MO—R$_2$SiO therein and to have a melting property. That is because, as a result of the presence of a material of such a glass system, heat resistance as well as airtight property and low melting point which are very difficult properties to be compatible can be satisfied at the same time. Here, the divalent metal M is preferably at least one member selected from Mg, Ca, Sr, Ba and Sn, and more desirably Sn.

It may also be an organic-inorganic hybrid glassy material having physical properties different from conventional properties or an organic-inorganic hybrid glassy material that is colored. For example, it may be an organic-inorganic hybrid glassy material where physical properties of glass such as water resistance are improved by introduction of Nb, Zr, Ti, etc. as an oxide; an organic-inorganic hybrid glassy material where various physical properties are varied by introduction of transition metal ion such as V, Cr, Mn, Fe, Co, Ni, Cu, Zn, etc.; or an organic-inorganic hybrid glassy material which is colored or emits fluorescence by containment of rare earth ion (Ce, Pr, Nd, Pm, Sm, Eu, Gd, Tb, Dy, Ho, Er, Tm, etc.) or organic dye. It goes without saying that the contents of this paragraph are applicable not only to the second characteristic of the present invention but also to the first, third and fourth characteristics thereof.

Further, it is preferably an organic-inorganic hybrid glassy material where the softening point changes by conducting an aging. That is because an organic-inorganic hybrid glassy material where the softening point does not change often does not show a melting property. In this case, it is more preferable that the softening point tends to rise by aging. It is much preferable that the softening point before aging is 60 to 150° C. and that the softening point after aging is 100 to 350° C.

Incidentally, it is preferable that this organic-inorganic hybrid glassy material has a softening temperature of 80° C. to 400° C. When it is lower than 80° C., chemical stability of the resulting organic-inorganic hybrid glassy material is low. When it is higher than 400° C., there are many cases where a melting property is lost. More preferably, it is 100° C. to 380° C. and, still more preferably, it is 100° C. to 350° C. Incidentally, the softening point of an organic-inorganic hybrid glassy material can be judged by means of a TMA measurement with a temperature-raising rate of 10° C./minute. Thus, the contraction amount is measured under the above-mentioned condition, and the change start temperature of the contraction amount is judged as the softening temperature.

It is preferable to be an organic-inorganic hybrid glassy material having such an airtight property where exudation of an organic dye is not found for one month. That is because, although many organic-inorganic hybrid glassy materials have problems in terms of airtight property, the organic-inorganic hybrid glassy material that has a melting property and that could be aged as in the present invention has an enhanced airtight property. It goes without saying that the contents of this paragraph are applicable not only to the second characteristic of the present invention but also to the first, third and fourth characteristics thereof.

In the following, the third characteristic of the present invention will be mentioned in detail.

The containment of the D unit makes it possible to have a low melting point and its thermal stability. Here, the D unit comprises a $D^2$ unit where, in four bonds of a silicon atom, all two thereof excluding the bonds with two organic substituents are bonded to silicon atoms through oxygen atoms or a $D^1$ unit where one of them is bonded to a silicone atom through an oxygen atom while another is bonded to an ethoxy group or hydroxyl group. A $T^3$ unit means a state where, in four bonds of a silicon atom, all three thereof excluding the bond with one organic substituent are bonded to silicon atoms through oxygen atoms; a $T^2$ unit means a state where, in four bonds of a silicon atom, two of the three thereof excluding the bond with one organic substituent are bonded to silicon atoms through oxygen atoms; and a $T^1$ unit means a state where, in four bonds of a silicon atom, one of the three thereof excluding the bond with one organic substituent is bonded to a silicon atom through an oxygen atom. Further, in the $T^2$ unit, the state where, in four bonds of a silicon atom, two of the three thereof excluding the bond with one organic substituent are bonded to silicon atoms through oxygen atoms while another is an ethoxy group is named $T^2$(—OEt). Still further, in the $T^2$ unit, the state where, in four bonds of a silicon atom, two of the three thereof excluding the bond with one organic substituent are bonded to silicone atoms through oxygen atoms while another is hydroxyl group is named $T^2$(—OH). With regard to them, their presence and content can be confirmed by, for example, a $^{29}$Si NMR spectroscopic method.

When the ratio of D unit to (D unit+$T^3$ unit+$T^2$ unit+$T^1$ unit) is less than 0.05, there is generated a problem that a low-temperature fusion is not achieved. When it is greater than 0.50, there is generated a problem that mechanical strength becomes inferior. Therefore, 0.05 to 0.50 is preferable. More preferably, it is 0.08 to 0.40 and, still more preferably, it is 0.10 to 0.30.

It is preferable that the D unit which is added is a crystalline material or a liquid material selected from diethoxydiphenylsilane, diethoxydimethylsilane, diethoxydiethylsilane and diethoxymethylphenylsilane. The D unit prepared from these raw materials contributes to making the softening point lower and can provide a stable organic-inorganic hybrid glassy material. It is preferable that the D unit to be added is a crystalline or liquid material. Particularly, when it is a crystalline one, the yield is also high, and it is possible to obtain a more preferable organic-inorganic hybrid glassy material.

It is preferable that a metal alkoxide used as a raw material of the organic-inorganic hybrid glassy material is selected from phenyltriethoxysilane, methyltriethoxysilane and ethyltriethoxysilane. Inherently, the metal alkoxide used as the raw material is an alkoxysilane substituted with an organic substituent. It is preferably selected from metal alkoxides where the organic substituent is phenyl group, methyl group, ethyl group, propyl group (n- and i-), butyl group (n-, i- and t-), pentyl group, hexyl group, octyl group, decyl group, dodecyl group, octadecyl group, mercaptomethyl group, mercaptopropyl group, 3,3,3-trifluoropropyl group, 3-trifluoroacetoxypropyl group, vinyl group, benzyl group, styryl group, etc., and where the alkoxyl group is methoxy group, ethoxy group, propyl group (n- and i-), etc. These are very useful materials for the production of an organic-inorganic hybrid glassy material. Incidentally, metal alkoxides other than the above-mentioned ones may be used as well. Production is also possible so far as a material, which has been used in sol-gel processes, such as metal acetylacetonate, metal carboxylate, metal nitrate, metal hydroxide and metal halide, is used. Still, it is preferably selected from the above-mentioned phenyltriethoxysilane, methyltriethoxysilane and ethyltriethoxysilane. It goes without saying that the contents of this paragraph are applicable not only to the third characteristic of the present invention but also to the first, second and fourth characteristics of the present invention.

In a process for production of an organic-inorganic hybrid glassy material, having a heating reaction step between a mixing step of the starting materials and a melting step and also having an aging step after the melting step, it is also preferable to add a D unit in the heating reaction step and/or the melting step. This process for production is greatly different from the conventional sol-gel processes and is characterized in having a heating reaction step, a melting step and an aging step and it is most useful to add a D unit in the heating reaction step and/or the melting step. Its addition in the mixing step before that may cause heterogeneity of the reaction while its addition in the aging step after that may cause a problem in stabilization of an organic-inorganic hybrid glassy material.

As mentioned above, it is preferable in the aging step that the temperature for aging is from about the lower limit temperature for fusion to (the lower limit temperature for fusion +150° C.). In this case, it is preferable to conduct under a pressure of not higher than 0.1 Torr at the same time. When the pressure is higher than 0.1 Torr, a problem of residual bubbles is generated.

As a result of conducting the above melting step and/or aging step, a stabilized organic-inorganic hybrid glassy material can be prepared. In the conventional sol-gel processes, there is neither melting step nor aging step, and therefore it is not obtain to produce an organic-inorganic hybrid glassy material of the present invention.

In a melting step or an aging step by means of heating, it is also effective to conduct it in an inert atmosphere or to heat by microwave.

With regard to alcohol, the representative ones are methanol, ethanol, 1-propanol, 2-propanol, 1-butanol, 2-methyl-1-propanol, 2-butanol, 1,1-dimethyl-1-ethanol, etc. although it is not limited to these. It goes without saying that the contents of this paragraph are applicable not only to the third characteristic of the present invention but also to the first, second and fourth characteristics thereof.

According to the third characteristic of the present invention, there is provided an organic-inorganic hybrid glassy material having at least D unit in all of or a part of the glassy material.

Incidentally, it is preferable in an organic-inorganic hybrid glassy material that the ratio of D unit to (D unit+$T^3$ unit+$T^2$ unit+$T^1$ unit) is 0.05 to 0.50, and, at the same time, the ratio of $T^3$ unit to (D unit+$T^3$ unit+$T^2$ unit+$T^1$ unit) is 0.30 to 0.95. When the ratio of $T^3$ unit to (D unit+$T^3$ unit+$T^2$ unit+$T^1$ unit) is less than 0.30, there is a problem that mechanical strength is poor. When it is more than 0.95, there is a problem that no low fusion property is achieved. More preferably, it is 0.50 to 0.90. When the ratio of D unit to (D unit+$T^3$ unit+$T^2$ unit+$T^1$ unit) is less than 0.05, there is a problem that no low fusion property is achieved. When it is more than 0.50, there is a problem of poor mechanical strength. More preferably, it is 0.10 to 0.30. Within this range, it is possible to prepare an organic-inorganic hybrid glassy material having a softening point of 50° C. to 350° C. and also being stable. Incidentally, the softening point of the organic-inorganic hybrid glassy material was judged from a TMA measurement wherein the temperature was raised at 10° C./minute. Thus, the contraction amount is measured under the above-mentioned condition, and the temperature, at which the change of the contraction amount started, was defined as softening temperature.

In the following, the fourth characteristic of the present invention will be mentioned in detail.

According to the fourth characteristic of the present invention, it was possible to produce an ultraviolet and visible ray transmitting organic-inorganic hybrid glassy material, which simultaneously satisfies heat resistance, airtight property and low-melting characteristic and shows a high transmission within a region including ultraviolet and visible rays, and which has been very difficult to be prepared.

According to the fourth characteristic of the present invention, there is provided an ultraviolet-visible ray transmitting organic-inorganic hybrid glassy material, in which at a thickness of 3 mm transmittance at 630 nm wavelength is not less than 80%, transmittance at 470 nm wavelength is not less than 80% and transmittance at 294 nm wavelength is not less than 50%. The reason why representative wavelengths in visible region are 630 nm and 470 nm here is that they are positioned in the center of the visible ray region and, at the same time, 630 to 470 nm are both ends of green region where transmission is difficult, while the reason why representative wavelengths in ultraviolet region are 294 nm and 280 nm is that it is often in general that absorption suddenly changes in this region.

With regard to an organic-inorganic hybrid glassy material where ultraviolet ray and visible ray are transmissive, it is preferable that the average transmittance for visible light in wavelengths of 350 to 800 nm is 80% or more. That is because many materials are demanded to have a high light transmittance in the visible light region or, in other words, to have a so-called high transparency. For example, when the region is made transparent, each of lights of blue, red, green, etc. can be transmitted whereby its applicability is made broad. An organic-inorganic hybrid glassy material of the present invention has a characteristic that it is colorless and transparent. In general, there are many cases where organic-inorganic hybrid glassy materials are colored in light yellow and it goes without saying that it is limited to a colorless and transparent organic-inorganic hybrid glassy material.

With regard to an organic-inorganic hybrid glassy material where ultraviolet ray and visible light are transmissive, it is preferable that the average transmittance for ultraviolet ray at wavelengths of 295 to 350 nm is 70% or more. It is often under the recent condition that the transmission of ultraviolet ray is also very important. For example, white diode, which has been recently receiving attention, utilizes a light-emitting phenomenon of fluorescent materials by ultraviolet ray, and therefore the transmission of ultraviolet ray is indispensable.

With regard to an organic-inorganic hybrid glassy material where ultraviolet ray and visible light are transmissive, it is preferable that its softening point is −20 to 400° C. When the softening temperature is lower than −20° C., there arises a problem that it cannot stably be used at room temperature. On the other hand, when it is higher than 400° C., there arises a problem that the low-melting property cannot be utilized.

Further, with regard to an organic-inorganic hybrid glassy material of the present invention, where ultraviolet ray and visible light are transmissive, it is preferable that a coloring material or a fluorescent material is mixed in a part of or all of the glassy material. That is because, in some cases, it is necessary to cut off specific wavelength in a wavelength region of longer than 630 nm, especially in the infrared region. It is also possible that a fluorescent material, which mainly reacts with the ultraviolet ray, is mixed with a part of or all of the organic-inorganic hybrid glassy material where ultraviolet ray and visible light are transmissive whereby a light having a specific wavelength is emitted. It is further possible that a complementary color relation is utilized whereby, for example, a white color can be obtained.

An organic-inorganic hybrid glassy material of the fourth characteristic of the present invention can be prepared as follows. That is, it is preferably produced through a heating reaction step, a melting step and an aging step, after a mixing step by a metal alkoxide, water, an acid catalyst and an alcohol used as raw materials. With regard to the acid catalyst, acetic acid or hydrochloric acid is often used. With regard to the alkaline catalyst, ammonia is often used.

Water, which is used in the mixing step, is preferable to be 1.0-fold or more in terms of molar ratio to the alcohol. Although being dependent upon the type of alcohol, water has been considered to be in a minimum amount necessary for hydrolysis in the conventional sol-gel processes. This is derived from a basic problem of suppressing a quick hydrolysis and the production of an unstable sol. Although much amount of water may be used for the formation of a thin sol-gel film, it is made as little as possible for the preparation in the form of bulk. For example, about 0.3-fold of alcohol has been used in the conventional methods. However, when it has an aging step, there arises a problem that much time is needed for the aging step when water used in the mixing step is less than 1.0-fold of alcohol. When the amount of water is too much, a long time is also needed in the aging step. Therefore, it is more preferable that the amount is from 1.0-fold to 5.0-fold of alcohol. Incidentally, in the mixing step, water, ethanol and acid catalyst are added to an oxide precursor, followed by mixing with stirring, but this order is non-limitative.

In the following, embodiments of the present invention will be specifically illustrated by way of the following Examples, although the present invention is not limited to these Examples. Examples 1-1 to 1-5 are illustrative of the first characteristic of the present invention. Examples 2-1 to 2-20 are illustrative of the second characteristic of the present invention. Examples 3-1 to 3-2 are illustrative of the third characteristic of the present invention. Examples 4-1 to 4-3 are illustrative of the fourth characteristic of the present invention.

EXAMPLE 1-1

With regard to the starting materials, phenyltriethoxysilane $(PhSi(OEt)_3)$ as a metal alkoxide and ethanol were used. As a mixing step, 45 ml of water, 30 ml of ethanol and hydrochloric acid as a catalyst were added to 10 ml of phenyltriethoxysilane at room temperature, and the mixture was stirred at 80° C. for 3 hours as a heating reaction step and then melted for 1 hour by raising the temperature up to 150° C. Since it was separated into two layers, a supernatant layer and a melted liquid, after the fusion, the supernatant liquid was discarded. The melted liquid of the lower side was extracted, aged at 200° C. for 5 hours, followed by cooling down to room temperature to obtain a transparent material. As such, it was possible to obtain an organic-inorganic hybrid material in about 10 hours, which was about one-tenth as compared with the case where the preparation was carried out by the conventional sol-gel processes.

The softening temperature of this transparent material was 89° C., and it was lower than the decomposition temperature of phenyl group, which was about 400° C. Further, in view of the fact that it was possible to confirm the random network structure by AVATOR 360 type which was an infrared absorption spectrometer of Nicolet and by CMX-400 type which was a magnetic resonance measurement apparatus of JEOL, the transparent material prepared in this time was a material having an organic-inorganic hybrid glass structure or, in other words, it was an organic-inorganic hybrid glassy material.

In order to check the airtightness property of this organic-inorganic hybrid glassy material, an organic dye was introduced into the obtained organic-inorganic hybrid glassy material and its exudation condition after one month was observed. As a result, no exudation was noted at all whereby it was found that the material satisfied the airtightness property. Then, the transition point of this organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

Incidentally, as shown in FIG. 1, the softening point of the organic-inorganic hybrid glassy material was judged from a TMA measurement by raising the temperature at 10° C./minute. FIG. 1 is the result of the present example. That is, the softening behavior was determined from the change of the contraction amount under the above condition and the starting temperature thereof was defined as the softening temperature.

EXAMPLE 1-2

With regard to the starting materials, a mixed system of phenyltriethoxysilane (PhSi(OEt)$_3$) and methyltriethoxysilane, which are metal alkoxides, was used, and their ratio was 9:1. Acetic acid, which was a catalyst, was added to 10 ml of phenyltriethoxysilane, 1 ml of methyltriethoxysilane, 40 ml of water and 30 ml of ethanol in a container, and the mixture was stirred for 3 hours at 80° C. as a heating reaction step and then melted for 1 hour by raising the temperature up to 150° C. Unlike Example 1-1, no phase separation took place after melting, but it was a colorless and transparent melted liquid. After further being aged for 5 hours at 200° C., it was cooled down to room temperature to obtain a transparent material.

Figure 2:
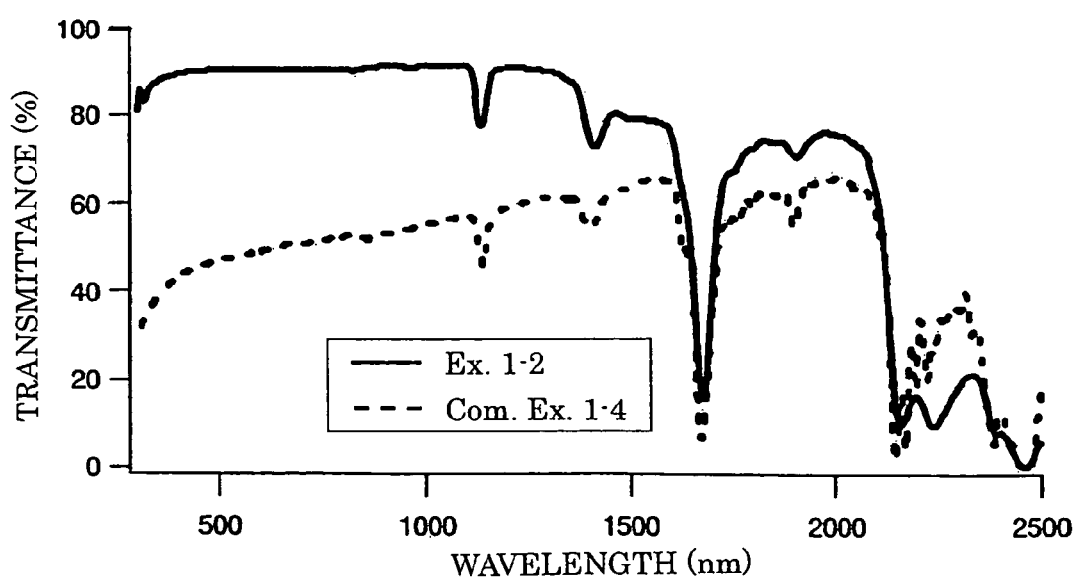
FIG. 2 shows the data of ultraviolet-visible transmission spectra as shown in Example 1-2 of the present invention and Comparative Example 1-4.

Softening temperature of this transparent material was 86° C. In view of the fact that it was possible to confirm the random network structure by AVATOR 360 which was an infrared absorption spectrometer of Nicolet and by CMX-400 which was a magnetic resonance measurement apparatus of JEOL, the transparent material obtained in this time was a material having an organic-inorganic hybrid glass structure. In other words, it was an organic-inorganic hybrid glassy material. As shown in FIG. 2, a transmittance curve of the organic-inorganic hybrid glassy material in a wavelength region of 300 to 2,500 nm was measured using a Hitachi U-3500 type automatic recording spectrophotometer. The data in solid line mentioned as Example 1-2 correspond to this. As will be apparent from this result, it is noted that there is no absorption for the color, which was noted in visible region, especially absorption in a region of blue color, which was noted until now. Incidentally, the average transmittance in wavelengths of 295 to 350 nm was 84.2%, and the average transmittance in wavelengths of 350 to 800 nm was 90.2%.

In order to check the airtightness property of this organic-inorganic hybrid glassy material, an organic dye was introduced into the obtained organic-inorganic hybrid glassy material and its exudation condition after one month was observed. As a result, no exudation was noted at all whereby it was found that the material satisfied the airtightness property. Then, the transition point of this organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

EXAMPLE 1-3

With regard to the starting materials, a mixed system of phenyltriethoxysilane and diethoxydiphenylsilane, which are metal alkoxides, was used and their ratio was 7:3. Acetic acid, which is a catalyst, was added to 9 ml of phenyltriethoxysilane, 4 ml of diethoxydiphenylsilane, 40 ml of water and 30 ml of ethanol in a container, and the mixture was stirred for 3 hours at 80° C. as a heating reaction step and then melted for 1 hour by raising the temperature up to 150° C. Unlike Example 1-1, no phase separation took place after the melting, but it was a colorless and transparent melted liquid. After it was further aged for 5 hours at 200° C., it was cooled down to room temperature to obtain a transparent material.

Figure 3:
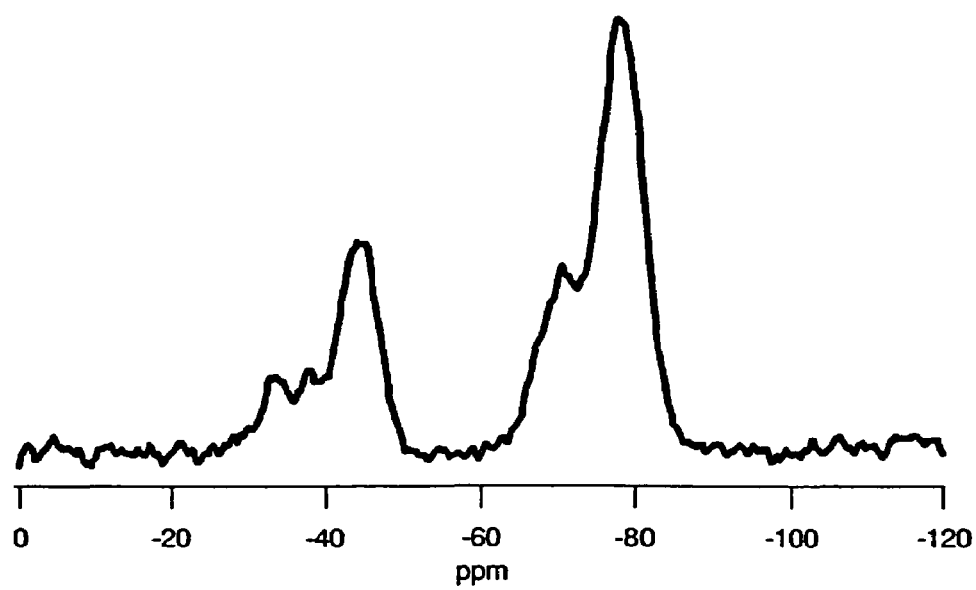
FIG. 3 shows the $^{29}$Si NMR spectral chart as shown in Example 1-3 of the present invention.

Softening temperature of this transparent material was 83° C. In view of the fact that it was possible to confirm the random network structure by AVATOR 360 type which was an infrared absorption spectrometer of Nicolet and by CMX-400 type which was a magnetic resonance measurement apparatus of JEOL as shown in FIG. 3, the transparent material prepared in this time was a material having an organic-inorganic hybrid glass structure or, in other words, it was an organic-inorganic hybrid glassy material. In order to check the airtightness property of this organic-inorganic hybrid glassy material, an organic dye was introduced into the obtained organic-inorganic hybrid glassy material and its exudation condition after one month was observed. As a result, no exudation was noted at all whereby it was found that the material satisfied the airtightness property. Then, the transition point of this organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

EXAMPLE 1-4

With regard to the starting materials, a mixed system of phenyltriethoxysilane and diethoxydimethylsilane, which are metal alkoxides, was used and their ratio was 8:2. Acetic acid, which is a catalyst, was added to 10 ml of phenyltriethoxysilane, 2 ml of diethoxydimethylsilane, 40 ml of water and 30 ml of ethanol in a container and the mixture was stirred for 3 hours at 80° C. as a heating reaction step and then melted for 1 hour by raising the temperature up to 150° C. Unlike Example 1-1, no phase separation took place after the melting, but it was a colorless and transparent melted liquid. After it was further aged for 5 hours at 200° C., it was cooled down to room temperature to obtain a transparent material.

Softening temperature of this transparent material was 85° C. In view of the fact that it was possible to confirm the random network structure by AVATOR 360 type which was an infrared absorption spectrometer of Nicolet and by CMX-400 type which was a magnetic resonance measurement apparatus of JEOL, the transparent material prepared in this time was a material having an organic-inorganic hybrid glass structure or, in other words, it was an organic-inorganic hybrid glassy material. In order to check the airtightness property of this organic-inorganic hybrid glassy material, an organic dye was introduced into the obtained organic-inorganic hybrid glassy material and its exudation condition after one month was observed. As a result, no exudation was noted at all whereby it was found that the material satisfied the airtightness property. Then, the transition point of this organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

EXAMPLE 1-5

With regard to the starting materials, a mixed system of phenyltriethoxysilane and diethoxydiethylsilane, which are metal alkoxides, was used and their ratio was 9:1. Acetic acid, which is a catalyst, was added to 10 ml of phenyltriethoxysilane, 1 ml of diethoxydiethylsilane, 40 ml of water and 30 ml of ethanol in a container and the mixture was stirred for 3 hours at 80° C. as a heating reaction step and then melted for 1 hour by raising the temperature up to 150° C. Unlike Example 1-1, no phase separation took place after melting, but a colorless and transparent melted liquid was obtained. After it was further aged for 5 hours at 200° C., it was cooled down to room temperature to give a transparent material.

Softening temperature of this transparent material was 82° C. In view of the fact that it had the random network structure, the transparent material prepared in this time was a material having an organic-inorganic hybrid glass structure or, in other words, it was an organic-inorganic hybrid glassy material. In order to check the airtightness property of this organic-inorganic hybrid glassy material, an organic dye was introduced into the obtained organic-inorganic hybrid glassy material and its exudation condition after one month was observed. As a result, no exudation was noted at all whereby it was found that the material satisfied the airtightness property. Then, the transition point of this organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

COMPARATIVE EXAMPLE 1-1

A gel material was obtained by a conventional sol-gel process using nearly the same materials as in Example 1-1. That is, after stirring at about 20° C. for 5 hours, the materials were allowed to stand still at about 20° C. for three days to give a wet gel. After that, it was dried at about 100° C. for about 10 hours and the resulting dry gel was pulverized, washed, filtered and then sintered at not lower than 750° C. to give a bulky or fibrous product. About 100 hours (about four days) were needed in total in finishing all those steps.

Incidentally, immediately after the wet gel material was dried at about 100° C., it was sintered at about 600° C. As a result, the resulting material turned black and did not soften even at 800° C. and it could not be said to be a low-melting material.

COMPARATIVE EXAMPLE 1-2

A gel material was obtained by a conventional sol-gel process using nearly the same materials as in Example 1-1. The gel material was melted at 135° C. for one hour and then tried to age at 20° C. Thus, it was treated at 20° C. for one week, but the material was an unstable product where softening temperature, for example, varied as a result of elapse of time and depending upon the treatment temperature. Thus, it was not a stable glassy material.

COMPARATIVE EXAMPLE 1-3

A gel material was obtained by a conventional sol-gel process using nearly the same materials as in Example 1-2. The gel material was melted at 450° C. for 5 hours and then tried to age at 500° C. As a result, the obtained material was in a brown color and did not soften even at 800° C. and it could not be said to be a low-melting material.

COMPARATIVE EXAMPLE 1-4

An organic-inorganic hybrid glassy material was obtained using nearly the same materials as in Example 1-1 and by nearly the same process. However, after the melting step, the melted liquid separated into two layers was aged as it was. As shown in FIG. 3, a transmittance curve of the obtained organic-inorganic hybrid glassy material in a wavelength region of 300 to 2,500 nm was measured by the same manner as in Example 1-2. The data in a solid line mentioned as "Comparative Example 1-4" correspond to that. As will be apparent from this result, the optical transmittance was lower than in the case of Example 1-2. Incidentally, the average transmittance in wavelengths of 295 to 350 nm was 34.2%, while the average transmittance in 350 to 800 nm was 47.9%.

EXAMPLE 2-1

A mixed system of about 10 ml of phenyltriethoxysilane (PhSi(OEt)$_3$) and about 2 ml of ethyltriethoxysilane (EtSi(OEt)$_3$), which were metal alkoxides, were used as the starting materials and their molar ratio was 8:2. About 45 ml of water (its molar ratio to phenyltriethoxysilane was 50), about 30 ml of ethanol (its molar ratio to phenyltriethoxysilane was 10) and about 0.5 ml of hydrochloric acid (its molar ratio to phenyltriethoxysilane was 0.01), which was a catalyst, were added to phenyltriethoxysilane and ethyltriethoxysilane in a container, stirred at 80° C. for 3 hours as a heating reaction step and melted for 1 hour after raising the temperature up to 150° C. Since the product after the fusion was separated into two layers of a supernatant liquid and a melted liquid, the supernatant liquid was discarded, and the melted liquid of the lower layer was extracted, further aged at 200° C. for 5 hours and cooled down to room temperature to give a transparent material. As such, it was possible to obtain an organic-inorganic hybrid material in about 10 hours, which is about one-tenth as compared with the case of the production by the conventional sol-gel process.

The starting point of the softening behavior was determined from the changes in the contraction amount in a TMA measurement by raising at 10° C./minute and the starting temperature was defined as the softening temperature, whereupon the softening temperature of this material was 119° C.

Figure 4:
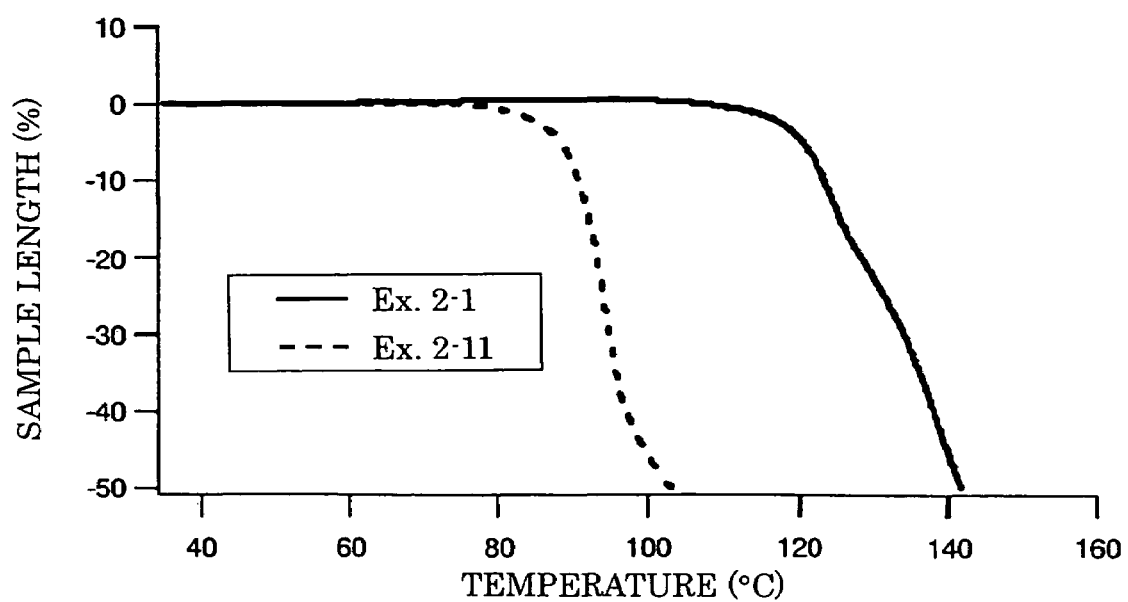
FIG. 4 shows the data of measurement of softening temperature (the result of TMA measurement) as shown in Examples 2-1 and 2-11 of the present invention.

The TMA curve of this material is shown in FIG. 4. Furthermore, it was confirmed by a CMX-400 type magnetic resonance measuring apparatus of JEOL Co. that a silicon unit $R_nSiO_{(4-n)/2}$ (R: an organic functional group; n: 1 to 3) was present. In view of the fact that it also had a random network structure, the transparent material obtained in this time is a material having an organic-inorganic hybrid glass structure. In other words, it is an organic-inorganic hybrid glassy material.

In order to check the airtight property of this organic-inorganic hybrid glassy material, an organic dye (Methylene Blue) was put into the obtained organic-inorganic hybrid glassy material, and its exudation condition after one month was observed. As a result, no exudation was noted at all whereby it was found that the material satisfied an airtight property. Then, softening point of the organic-inorganic hybrid glassy material, which had been allowed to stand for 300 hours under an atmosphere of 100° C. was measured, but no change was noted, whereupon it was confirmed that there was no problem in heat resistance. Further, the obtained organic-inorganic hybrid glassy material was allowed to stand still in the air for one month, but no particular change was noted, whereupon it was confirmed that the material was excellent in terms of chemical durability as well.

EXAMPLE 2-2

The glassy material after the chemical durability test conducted in Example 2-1 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 200° C. and about 0.05 Torr for 5 minutes and a second aging treatment in the air at 220° C. for 1 hour was conducted and then cooled down to room temperature. As a result, the softening temperature changed to 125° C. The glassy material was subjected to the same exudation test and the same chemical durability test as in Example 2-1, whereupon it was possible to confirm that there was no problem.

EXAMPLE 2-3

Acetic acid was used as a catalyst while other materials nearly the same as those in Example 2-1 were used, and the synthesis was conducted by the same manner, whereupon, unlike Example 2-1, the phase separation did not take place after the fusion, but a colorless and transparent melted liquid was obtained. Therefore, under such condition it was subjected to an aging step to give a transparent material. Incidentally, herein, an isopropoxide of Ti was mixed in the raw materials.

Softening temperature of this material was 130° C. Refractive index of this material was 1.63 and an effect of increasing the refractive index by mixing of Ti could be confirmed. It was also confirmed by a CMX-400 type magnetic resonance measuring apparatus of JEOL that a silicon unit $R_nSiO_{(4-n)/2}$ (R: an organic functional group; n: 1 to 3) was present. In view of the fact that it also had a random network structure, the transparent material obtained in this time is a material having an organic-inorganic hybrid glass structure. In other words, it is an organic-inorganic hybrid glassy material.

In order to check the airtight property of this organic-inorganic hybrid glassy material, an organic dye (Methylene Blue) was put into the obtained organic-inorganic hybrid glassy material, and its exudation condition after one month was observed. As a result, no exudation was noted at all whereby it was found that the material satisfied an airtight property. Then, softening point of the organic-inorganic hybrid glassy material, which had been allowed to stand for 300 hours under an atmosphere of 100° C. was measured, but no change was noted, whereupon it was confirmed that there was no problem in heat resistance. Further, the obtained organic-inorganic hybrid glassy material was allowed to stand still in the air for one month, but no particular change was noted, whereupon it was confirmed that the material was excellent in terms of chemical durability as well.

EXAMPLE 2-4

The glassy material after the chemical durability test conducted in Example 2-3 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 200° C. and about 0.05 Torr for 5 minutes and a second aging treatment in the air at 220° C. for 2 hours was conducted and then cooled down to room temperature. As a result, the softening temperature changed to 141° C. The glassy material was subjected to the same exudation test and the same chemical durability test as in Example 2-3, whereupon it was possible to confirm that there was no problem.

EXAMPLE 2-5

Nearly the same materials as in Example 2-3 were used and a transparent material was obtained by the same treatment method. Herein, however, a chloride of Zn was mixed in the raw materials.

Softening temperature of this material was 115° C. and an effect of making the softening temperature low by mixing of Zn could be confirmed. It was also confirmed by a CMX-400 type magnetic resonance measuring apparatus of JEOL that a silicon unit $R_nSiO_{(4-n)/2}$ (R: an organic functional group; n: 1 to 3) was present. In view of the fact that it also had a random network structure, the transparent material obtained in this time is a material having an organic-inorganic hybrid glass structure. In other words, it is an organic-inorganic hybrid glassy material.

In order to check the airtight property of this organic-inorganic hybrid glassy material, an organic dye (Methylene Blue) was put into the obtained organic-inorganic hybrid glassy material, and its exudation condition after one month was observed. As a result, no exudation was noted at all whereby it was found that the material satisfied an airtight property. Then, softening point of the organic-inorganic hybrid glassy material, which had been allowed to stand for 300 hours under an atmosphere of 100° C. was measured, but no change was noted, whereupon it was confirmed that there was no problem in heat resistance. Further, the obtained organic-inorganic hybrid glassy material was allowed to stand still in the air for one month, but no particular change was noted, whereupon it was confirmed that the material was excellent in terms of chemical durability as well.

EXAMPLE 2-6

The glassy material after the chemical durability test conducted in Example 2-5 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 200° C. and about 0.05 Torr for 5 minutes and a second aging treatment in the air at 200° C. for 1 hour was conducted and then cooled down to room temperature. As a result, the softening temperature changed to 119° C. The glassy material was subjected to the same exudation test and the same chemical durability test as in Example 2-5, whereupon it was possible to confirm that there was no problem.

EXAMPLE 2-7

Nearly the same materials as in Example 2-3 were used and a similar material was obtained by the same treatment method. Herein, however, an organic dye Rhodamine 6G was put into the materials to try coloration.

Softening temperature of this material was 120° C., and a coloration was achieved in an almost homogeneous condition. It was also confirmed by a CMX-400 type magnetic resonance measuring apparatus of JEOL that a silicon unit $R_nSiO_{(4-n)/2}$ (R: organic functional group; n: 1 to 3) was present. In view of the fact that it also had a random network structure, the transparent material obtained in this time was a material is an organic-inorganic hybrid glass structure. In other words, it is an organic-inorganic hybrid glassy material.

In order to check the airtight property of the organic-inorganic hybrid glassy material, an organic dye Methylene Blue, which was different from Rhodamine 6G, was put into the obtained glassy material, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

EXAMPLE 2-8

The glassy material after the chemical durability test conducted in Example 2-7 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 210° C. and about 0.05 Torr for 5 minutes and a second aging treatment in the air at 220° C. for 1 hour was conducted and then cooled down to room temperature. As a result, the softening temperature changed to 126° C. The glassy material was subjected to the same exudation test and the same chemical durability test as in Example 2-7, whereupon it was possible to confirm that there was no problem.

EXAMPLE 2-9

Nearly the same materials as in Example 2-3 were used and a transparent material was obtained by the same treatment method. Herein, however, Er in the form of a chloride was put into the raw materials and a fluorescent emission was tried.

Softening temperature of this material was 124° C. When observed in darkness, it was possible to confirm that, upon excitation with a light of 380 nm, the entire glassy material was fluorescently emitted in a beautifully green color. It was also confirmed by a CMX-400 magnetic resonance measuring apparatus of JEOL that a silicon unit $R_nSiO_{(4-n)/2}$ (R: an organic functional group; n: 1 to 3) was present. In view of the fact that it also had a random network structure, the transparent material obtained in this time is a material having an organic-inorganic hybrid glass structure. In other words, it is an organic-inorganic hybrid glassy material.

In order to check the airtight property of this organic-inorganic hybrid glassy material, an organic dye Methylene Blue was put therein, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand still in the air for one month, but no particular change was noted whereupon it was confirmed that the material was excellent in terms of chemical durability as well.

EXAMPLE 2-10

The glassy material after the chemical durability test conducted in Example 2-9 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 210° C. and about 0.05 Torr for 5 minutes and a second aging treatment in the air at 220° C. for 2 hours was conducted and then cooled down to room temperature. As a result, the softening temperature changed to 133° C. The glassy material was subjected to the same exudation test and the same chemical durability test as in Example 2-9, whereupon it was possible to confirm that there was no problem.

EXAMPLE 2-11

A mixed system of about 10 ml of phenyltriethoxysilane ($PhSi(OEt)_3$) and about 2 ml of ethyltriethoxysilane ($EtSi(OEt)_3$), which were metal alkoxides, were used as the starting materials, and their molar ratio was 8:2. About 45 ml of water (its molar ratio to phenyltriethoxysilane was 50), about 30 ml of ethanol, about 0.5 ml of hydrochloric acid (its molar ratio to phenyltriethoxysilane was 0.01), which was a catalyst, and tin chloride were added to phenyltriethoxysilane and ethyltriethoxysilane in a container, followed by stirring at 80° C. for 3 hours as a heating reaction step and then a melting for 1 hour after raising the temperature up to 150° C. Since after the fusion it was separated into two layers of a supernatant liquid and a melted liquid, the supernatant liquid was discarded. The melted liquid of the lower side was extracted, further aged at 200° C. for 5 hours, and then cooled down to room temperature to give a transparent material. As such, it was possible to obtain an organic-inorganic hybrid material in about 10 hours that was about one-tenth as compared with the case of production by the conventional sol-gel process.

The starting point of softening behavior was determined from the changes of the contraction amount in a TMA measurement by raising at 10° C./minute and the starting temperature was defined as the softening temperature whereupon the softening temperature of this material was 89° C. The TMA curve of this material is shown in FIG. 4. It was also confirmed by a CMX-400 type magnetic resonance measuring apparatus of JEOL that SnO, $RSiO_{3/2}$ and $R_2SiO$ were present and that a material, which was represented by a so-called MO—$RSiO_{3/2}$ or MO—$R_2SiO$ (R: an organic functional group; M: a divalent metal) was present. In view of the fact that it had a random network structure, the transparent material obtained in this time is a material having an organic-inorganic hybrid glass structure. In other words, it is an organic-inorganic hybrid glassy material.

In order to check the airtight property of this organic-inorganic hybrid glassy material, an organic dye Methylene Blue was put into the obtained organic-inorganic hybrid glassy material, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand in the air for one month, but no particular change was noted whereupon it was confirmed that the material was excellent in terms of chemical durability as well.

EXAMPLE 2-12

The glassy material after the chemical durability test conducted in Example 2-11 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 200° C. and about 0.05 Torr for 5 minutes and a second aging treatment in the air at 210° C. for 3 hours was conducted and then cooled down to room temperature. As a result, the softening temperature changed to 94° C. The glassy material was subjected to the same exudation test and the same chemical durability test as in Example 2-11, whereupon it was possible to confirm that there was no problem.

EXAMPLE 2-13

Acetic acid was used as a catalyst while other materials nearly the same as those in Example 2-11 were used and a synthesis was conducted by the same manner, whereupon, unlike Example 2-11, the phase separation did not take place after the fusion, but it was a colorless and transparent melted liquid. Therefore, an aging step was conducted just as it was to give a transparent material. Incidentally, herein, an isopropoxide of Ti was mixed in the materials.

The softening temperature of this material was 100° C. and an effect of changing the physical property (change in a softening temperature and improvement in refractive index) by mixing of Ti could be confirmed. It was also confirmed by a CMX-400 magnetic resonance measuring apparatus of JEOL that SnO, $RSiO_{3/2}$ and $R_2SiO$ were present and that the material represented by a so-called MO—$RSiO_{3/2}$ or MO—$R_2SiO$ (R: an organic functional group; M: a divalent metal) was present. In view of the fact that it also had a random network structure, the transparent material obtained in this time is a material having an organic-inorganic hybrid glass structure. In other words, it is an organic-inorganic hybrid glassy material.

In order to check the airtight property of this organic-inorganic hybrid glassy material, an organic dye Methylene Blue was put therein, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand in the air for one month, but no particular change was noted whereupon it was confirmed that the material was excellent in terms of chemical durability as well.

EXAMPLE 2-14

The glassy material after the chemical durability test conducted in Example 2-13 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 210° C. and about 0.05 Torr for 5 minutes and a second aging treatment in the air at 230° C. for 2 hours was conducted and then cooled down to room temperature. As a result, the softening temperature changed to 107° C. The glassy material was subjected to the same exudation test and the same chemical durability test as in Example 2-13, whereupon it was possible to confirm that there was no problem.

EXAMPLE 2-15

Nearly the same materials as in Example 2-13 were used and a transparent material was obtained by the same treatment method. Herein, however, a chloride of Zn was mixed in the materials.

The softening temperature of this material was 88° C. and an effect of lowering the softening temperature by mixing of Zn could be confirmed. It was also confirmed by a CMX-400 magnetic resonance measuring apparatus of JEOL that SnO, $RSiO_{3/2}$ and $R_2SiO$ were present and that the material represented by a so-called MO-$RSiO_{3/2}$ or MO—$R_2SiO$ (R: an organic functional group; M: a divalent metal) was present. In view of the fact that it also had a random network structure, the transparent material obtained in this time is a material having an organic-inorganic hybrid glass structure. In other words, it is an organic-inorganic hybrid glassy material.

In order to check the airtight property of the organic-inorganic hybrid glassy material, an organic dye Methylene Blue was put therein, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand in the air for one month, but no particular change was noted whereupon it was confirmed that the material was excellent in terms of chemical durability as well.

EXAMPLE 2-16

The glassy material after the chemical durability test conducted in Example 2-15 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 200° C. and about 0.05 Torr for 5 minutes and a second aging treatment in the air at 220° C. for 2 hours was conducted and then cooled down to room temperature. As a result, the softening temperature changed to 92° C. The glassy material was subjected to the same exudation test and the same chemical durability test as in Example 2-15, whereupon it was possible to confirm that there was no problem.

EXAMPLE 2-17

Nearly the same materials as in Example 2-13 were used and a similar material was obtained by the similar treatment method. Herein, however, an organic dye Rhodamine 6G was mixed in the materials to try coloration.

Softening temperature of this material was 89° C. and coloration in an almost homogeneous state was possible. It was also confirmed by a CMX-400 type magnetic resonance measuring apparatus of JEOL that SnO, $RSiO_{3/2}$ and $R_2SiO$ were present and that the material represented by a so-called $MO-RSiO_{3/2}$ or $MO-R_2SiO$ (R: an organic functional group; M: a divalent metal) was present. In view of the fact that it also had a random network structure, the transparent material obtained in this time is a material having an organic-inorganic hybrid glass structure. In other words, it is an organic-inorganic hybrid glassy material.

In order to check the airtight property of the organic-inorganic hybrid glassy material, an organic dye Methylene Blue, which was different from Rhodamine 6G, was put therein, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand in the air for one month, but no particular change was noted whereupon it was confirmed that the material was excellent in terms of chemical durability as well.

EXAMPLE 2-18

The glassy material after the chemical durability test conducted in Example 2-17 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 190° C. and about 0.05 Torr for 5 minutes and a second aging treatment in the air at 220° C. for 3 hours was conducted and then cooled down to room temperature. As a result, the softening temperature changed to 93° C. The glassy material was subjected to the same exudation test and the same chemical durability test as in Example 2-17, whereupon it was possible to confirm that there was no problem.

EXAMPLE 2-19

Nearly the same materials as in Example 2-13 were used and a transparent material was prepared by the same treatment method. Herein, however, Er in the form of a chloride was mixed in the materials and a fluorescent emission was tried.

Softening temperature of this material was 95° C. When observed in darkness, it was confirmed that, upon excitation with a light of 380 nm, the entire glassy material was fluorescently emitted in a beautifully green color. It was also confirmed by a CMX-400 magnetic resonance measuring apparatus of JEOL that SnO, $RSiO_{3/2}$ and $R_2SiO$ were present and that the material represented by a so-called $MO-RSiO_{3/2}$ or $MO-R_2SiO$ (R: an organic functional group; M: a divalent metal) was present. In view of the fact that it also had a random network structure, the transparent material obtained in this time is a material having an organic-inorganic hybrid glass structure. In other words, it is an organic-inorganic hybrid glassy material.

In order to check the airtight property of the organic-inorganic hybrid glassy material, an organic dye Methylene Blue was put therein, and its exudation state after one month was observed. As a result, no exudation was noted at all whereby it was found that the material satisfied the airtight property. Then, the transition point of the organic-inorganic hybrid glassy material, which had been allowed to stand for 300 hours in an atmosphere of 100° C., was measured, but no change was noted whereupon it was confirmed that there was no problem in heat resistance. Further, the obtained organic-inorganic hybrid glassy material was allowed to stand in the air for one month, but no particular change was noted whereupon it was confirmed that the material was excellent in terms of chemical durability as well.

EXAMPLE 2-20

The glassy material after the chemical durability test conducted in Example 2-19 (placing in an atmosphere of 100° C. for 300 hours and then being allowed to stand still in the air for one month) was further subjected to an aging process. With regard to the aging upon this time, it was subjected to a two-stage aging of a first aging treatment in an atmosphere of about 200° C. and about 0.05 Torr for 5 minutes and a second aging treatment in the air at 230° C. for 3 hours was conducted and then cooled down to room temperature. As a result, the softening temperature changed to 105° C. The glassy material was subjected to the same exudation test and the same chemical durability test as in Example 2-19, whereupon it was possible to confirm that there was no problem.

COMPARATIVE EXAMPLE 2-1

Nearly the same materials as in Example 2-1 were used. Thus, water, ethanol and hydrochloric acid, which was a catalyst, were added to phenyltriethoxysilane and ethyltriethoxysilane in a container and the mixture was stirred at 20° C. for 3 hours as a heating reaction step and then subjected to a thermal treatment at 700° C.

As a result, the obtained material did not soften even at 800° C. and was unable to be said to be a low-melting material. Incidentally, it was not possible to confirm the presence of a material represented by $R_nSiO_{(4-n)/2}$ (R: an organic functional group; n: 1 to 3). Although the aging mentioned in Example 2-1 and Example 2-2 was tried, there was no change at all whereupon it was judged that no aging was possible.

COMPARATIVE EXAMPLE 2-2

Nearly the same materials as in Example 2-5 were used. Thus, water, ethanol and acetic acid, which was a catalyst, were added to phenyltriethoxysilane and ethyltriethoxysilane in a container and the mixture was stirred at 20° C. for 3 hours as a heating reaction step and then subjected to a thermal treatment at 750° C.

As a result, the obtained material did not soften even at 800° C. and was unable to be said to be a low-melting material. In the meanwhile, the product was blackened and was not colored as in Example 2-2 but was dirtily changed. Incidentally, the presence of a material represented by $R_nSiO_{(4-n)/2}$ (R: an organic functional group; n: 1 to 3) was unable to be confirmed. Although the aging mentioned in Example 2-1, etc. was tried, there was no change at all whereupon it was judged that no aging was possible.

COMPARATIVE EXAMPLE 2-3

Nearly the same materials as in Example 2-7 were used. Thus, water, ethanol and acetic acid, which was a catalyst, were added to phenyltriethoxysilane and ethyltriethoxysilane in a container. Immediately after that or, in other words, without heating reaction step, the mixture was subjected to a fusion at 150° C. for 1 hour and to a thermal treatment at 700° C.

As a result, the obtained material did not soften even at 800° C. and was unable to be said to be a low-melting material. It was also confirmed that no fluorescent coloring was present. Incidentally, it was not possible to confirm the presence of a material represented by $R_n SiO_{(4-n)/2}$ (R: an organic functional group; n: 1 to 3). Although the aging mentioned in Example 2-1, etc. was tried, there was no change at all whereupon it was judged that no aging was possible.

COMPARATIVE EXAMPLE 2-4

Ethyltriethoxysilane (EtSi(OEt)$_3$) as a metal alkoxide was used as a starting material. Water, ethanol, and acetic acid, which was a catalyst, were added to ethyltriethoxysilane in a container, stirred at 80° C. for 3 hours as a heating reaction step and tried to melt by raising the temperature up to 150° C., but no fusion took place. Then, an organic dye Methylene Blue was added in the stage of sol to conduct the same synthesis and the airtight property test was tried. When confirmed after one week, however, exudation from the gel was confirmed.

COMPARATIVE EXAMPLE 2-5

With regard to the starting materials, a mixed system of ethyltriethoxysilane (EtSi(OEt)$_3$) and methyltriethoxysilane (MeSi(OEt)$_3$) which are metal alkoxides was used, and their ratio was 8:2. Water, ethanol and hydrochloric acid, which was a catalyst, were added to ethyltriethoxysilane and methyltriethoxysilane in a container, stirred at 20° C. for 3 hours and raised up to 150° C. to try a fusion, but no fusion took place.

COMPARATIVE EXAMPLE 2-6

Nearly the same materials as in Example 2-11 were used. Thus, water, ethanol, hydrochloric acid, which was a catalyst, and tin chloride were added to phenyltriethoxysilane and ethyltriethoxysilane in a container, stirred at 20° C. for 3 hours as a heating reaction step and subjected to a thermal treatment at 700° C.

As a result, the obtained material did not soften even at 800° C. and was unable to be said to be a low-melting material. Although the presence of SnO was confirmed, it was not possible to confirm the presence of materials represented by $RSiO_{3/2}$ and $R_2SiO$ (R: an organic functional group). Although the aging mentioned in Example 2-11 and Example 2-12 was tried, there was no change at all whereupon it was judged that no aging was possible.

COMPARATIVE EXAMPLE 2-7

Nearly the same materials as in Example 2-15 were used. Thus, water, ethanol, acetic acid, which was a catalyst, and tin chloride were added to phenyltriethoxysilane and ethyltriethoxysilane in a container, stirred at 20° C. for 3 hours as a heating reaction step and subjected to a thermal treatment at 700° C.

As a result, the obtained material did not soften even at 800° C. and was unable to be said to be a low-melting material. Further, the product was blackened, and, unlike Example 2-2, it was not colored but dirtily changed. Although the presence of SnO was confirmed, it was not possible to confirm the presence of materials represented by $RSiO_{3/2}$ and $R_2SiO$ (R: an organic functional group). Although the aging mentioned in Example 2-1, etc. was tried, there was no change at all whereupon it was judged that no aging was possible.

COMPARATIVE EXAMPLE 2-8

Nearly the same materials as in Example 2-17 were used. Thus, water, ethanol, acetic acid, which was a catalyst, and tin chloride were added to phenyltriethoxysilane and ethyltriethoxysilane in a container, stirred at 20° C. for 3 hours as a heating reaction step and subjected to a thermal treatment at 750° C.

As a result, the obtained material did not soften even at 800° C. and was unable to be said to be a low-melting material. Further, it was confirmed that there was no fluorescent coloring. Although the presence of SnO was confirmed, it was not possible to confirm the presence of materials represented by $RSiO_{3/2}$ and $R_2SiO$ (R: an organic functional group). Although the aging mentioned in Example 2-1, etc. was tried, there was no change at all whereupon it was judged that no aging was possible.

COMPARATIVE EXAMPLE 2-9

Ethyltriethoxysilane (EtSi(OEt)$_3$) as a metal alkoxide was used as a starting material. Water, ethanol, hydrochloric acid, which was a catalyst, and tin chloride were added to ethyltriethoxysilane in a container, stirred at 80° C. for 3 hours as a heating reaction step and tried to melt by raising the temperature up to 150° C., but no fusion took place. Then, an organic dye Methylene Blue was added in the stage of sol to conduct the same synthesis and the airtight property test was tried, but, when confirmed after one week, exudation from the gel was confirmed.

COMPARATIVE EXAMPLE 2-10

With regard to the starting materials, a mixed system of ethyltriethoxysilane (EtSi(OEt)$_3$) and diethoxydimethylsilane (Me$_2$Si(OEt)$_2$), which were metal alkoxides, was used, and their ratio was 8:2. Water, ethanol, hydrochloric acid, which was a catalyst, and tin chloride were added to ethyltriethoxysilane and diethoxydimethylsilane in a container, stirred at 20° C. for 3 hours as a heating reaction step and raised up to 150° C. to try a fusion, but no fusion took place.

EXAMPLE 3-1

With regard to a material for introduction of D unit, diethoxydiphenylsilane (Ph$_2$Si(OEt)$_2$), which was a metal alkoxide, was used. To 4 ml of diethoxydiphenylsilane there were added about 45 ml of water (its molar ratio to diethoxydiphenylsilane was about 170), about 30 ml of ethanol (its molar ratio to diethoxydiphenylsilane was about 30) and about 0.30 ml of acetic acid, which was a catalyst (its molar ratio to diethoxydiphenylsilane was about 0.3) at room temperature, followed by mixing with stirring and the mixture was heated at 60° C. for 3 hours with stirring to give colorless and transparent needle-like crystals. By addition of the needle-like crystals, a D unit was introduced into an organic-inorganic hybrid glassy material.

Figure 5:
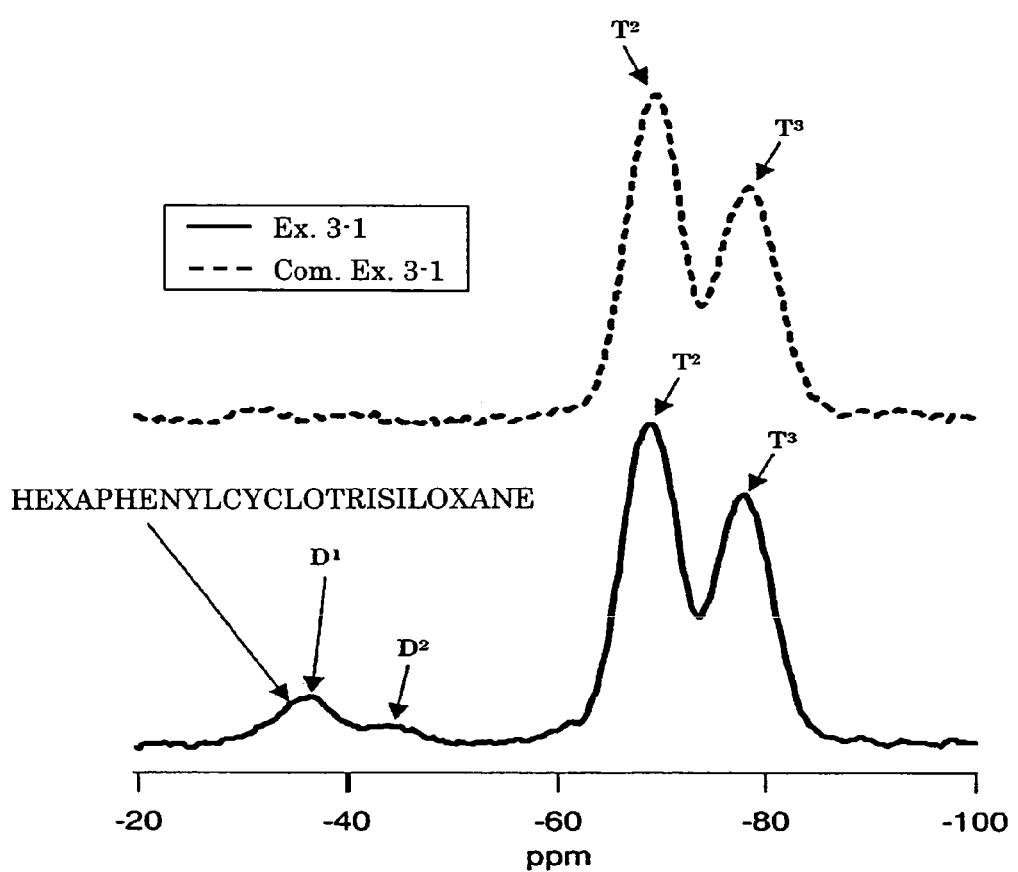
FIG. 5 shows the $^{29}$Si NMR spectral charts as shown in Example 3-1 of the present invention and Comparative Example 3-1.

With regard to a raw material for an organic-inorganic hybrid glassy material into which a D unit is introduced, phenyltriethoxysilane (PhSi(OEt)$_3$) as a metal alkoxide was used. As a mixing step, about 45 ml of water (its molar ratio to phenyltriethoxysilane was about 50), about 20 ml of ethanol (its molar ratio to phenyltriethoxysilane was about 10) and about 0.30 ml of acetic acid, which was a catalyst, (its molar ratio to phenyltriethoxysilane was about 0.1) were added to 10 ml of phenyltriethoxysilane at room temperature, followed by mixing with stirring. The mixture was heated at 60° C. for 3 hours with stirring as a heating reaction step and raised up to 150° C. followed by adding 1 g of needle-like crystals. The product was melted at 150° C. by spending 2 hours, aged at 150° C. for 3 hours, and then cooled down to room temperature to give a transparent material in the form of thin flakes having a thickness of 3 mm. FIG. 5 shows a $^{29}$Si NMR spectrum of this transparent material. The ratio of D unit of this transparent material to (D unit+T$^3$ unit+T$^2$ unit+T$^1$ unit) was 0.11, while the ratio of T$^3$ unit to (D unit+T$^3$ unit+T$^2$ unit+T$^1$ unit) was 0.38.

Softening temperature of this transparent material was 88° C. and was lower by 41° C. than 129° C., which was the softening point when no needle-like crystals were added. It was confirmed from this that the melting property at low temperature was promoted by the addition of needle-like crystals. In view of the fact that there was a random network structure, the transparent material, which was obtained in this time, is a material having an organic-inorganic hybrid glass structure. In other words, it is an organic-inorganic hybrid glassy material.

In order to check the airtight property of the organic-inorganic hybrid glassy material, an organic dye was put into the obtained organic-inorganic hybrid glassy material, and its exudation state after one month was observed. As a result, no exudation was noted at all whereby it was found that the material satisfied the airtight property. Further, the resulting organic-inorganic hybrid glassy material was allowed to stand in the air for one month, but no particular change was noted whereupon it was confirmed that the material was excellent in terms of chemical durability as well.

EXAMPLE 3-2

Phenyltriethoxysilane (PhSi(OEt)$_3$), which was a metal alkoxide, was used as a material for an organic-inorganic hybrid glassy material into which a D unit is introduced. As a mixing step, about 45 ml of water (its molar ratio to phenyltriethoxysilane was about 50), about 30 ml of ethanol (its molar ratio to phenyltriethoxysilane was about 10) and about 0.3 ml of acetic acid, which was a catalyst, (its molar ratio to phenyltriethoxysilane was about 0.1) were added to 10 ml of phenyltriethoxysilane at room temperature, followed by stirring at 60° C. for 1 hour as a heating reaction step. Then, as a material for introducing D unit, about 4 ml of diethoxydiphenylsilane (Ph$_2$Si(OEt)$_2$), which was a metal alkoxide, (its molar ratio to phenyltriethoxysilane was about 0.3) was added, followed by stirring at 60° C. for 2 hours. After that, it was melted at 150° C. by spending 2 hours, aged at 150° C. for 3 hours, and then cooled down to room temperature to give a transparent material in the form of thin flakes having a thickness of 3 mm. The ratio of D unit of this transparent material to (D unit+T$^3$ unit+T$^2$ unit+T$^1$ unit) was 0.25, while the ratio of T$^3$ unit to (D unit+T$^3$ unit+T$^2$ unit+T$^1$ unit) was 0.37.

Softening temperature of this transparent material was 67° C. and was lower than 129° C., which was the softening point when no diethoxydiphenylsilane was added. It was confirmed from this that the melting property at low temperature was promoted by the addition of needle-like crystals. In view of the fact that there was a random network structure, the transparent material, which was obtained in this time, is a material having an organic-inorganic hybrid glass structure. In other words, it is an organic-inorganic hybrid glassy material.

In order to check the airtight property of the organic-inorganic hybrid glassy material, an organic dye was put into the obtained organic-inorganic hybrid glassy material, and its exudation state after one month was observed. As a result, no exudation was noted at all whereby it was found that the material satisfied the airtight property. Further, the obtained organic-inorganic hybrid glassy material was allowed to stand in the air for one month, but no particular change was noted whereupon it was confirmed that the material was excellent in terms of chemical durability as well.

COMPARATIVE EXAMPLE 3-1

Phenyltriethoxysilane (PhSi(OEt)$_3$), which is a metal alkoxide, was used as a starting material. As a mixing step, about 45 ml of water (its molar ratio to phenyltriethoxysilane was about 50), about 30 ml of ethanol (its molar ratio to phenyltriethoxysilane was about 10) and about 0.3 ml of acetic acid, which was a catalyst, (its molar ratio to phenyltriethoxysilane was about 0.1) were added to 10 ml of phenyltriethoxysilane at room temperature, followed by stirring at 60° C. for 3 hours as a heating reaction step, then melted at 150° C. for 2 hours, then aging at 150° C. for 3 hours, and then cooling down to room temperature to give a transparent material in the form of thin flakes having a thickness of 3 mm. FIG. 5 shows a $^{29}$Si NMR spectrum of this transparent material. Incidentally, the ratio of D unit in this product to (D unit+T$^3$ unit+T$^2$ unit+T$^1$ unit) was naturally 0, while the ratio of T$^3$ unit to (T$^3$ unit+T$^2$ unit+T$^1$ unit) was 0.43.

Softening temperature of this transparent material was 129° C. and was higher than the softening temperature in the case where a D unit was introduced. In view of the fact that it also had a random network structure, the transparent material, which was obtained in this time, is a material having an organic-inorganic hybrid glass structure. In other words, it is an organic-inorganic hybrid glassy material.

In order to check the airtight property of the organic-inorganic hybrid glassy material, an organic dye was put into the obtained organic-inorganic hybrid glassy material, and its exudation state after one month was observed. As a result, no exudation was noted at all whereby it was found that the material satisfied the airtight property. Further, the obtained organic-inorganic hybrid glassy material was allowed to stand in the air for one month, but no particular change was noted whereupon it was confirmed that the material was excellent in terms of chemical durability as well.

EXAMPLE 4-1

Phenyltriethoxysilane (PhSi(OEt)$_3$), which is a metal alkoxide, was used as a starting material. As a mixing step, about 45 ml of water (its molar ratio to phenyltriethoxysilane was about 50), about 20 ml of ethanol (its molar ratio to phenyltriethoxysilane was about 10) and about 0.30 ml of acetic acid, which was a catalyst, (its molar ratio to phenyltriethoxysilane was about 0.1) were added to 10 ml of phenyltriethoxysilane at room temperature, followed by mixing with stirring. It was heated at 60° C. for 3 hours with stirring as a heating reaction step, raised up to 150° C. and melted by spending 2 hours. It was further aged at 150° C. for 3 hours, followed by cooling down to room temperature to give a transparent material in the form of thin flakes having a thickness of 3.0 mm.

Softening temperature of this transparent material was 130° C. and was lower than the decomposing temperature of phenyl group, which is about 400° C. In view of the fact that it also had a random network structure, the transparent material, which was obtained in this time, is a material having an organic-inorganic hybrid glass structure. In other words, it is an organic-inorganic hybrid glassy material.

In order to check the airtight property of the organic-inorganic hybrid glassy material, an organic dye was put into the obtained organic-inorganic hybrid glassy material, and its exudation state after one month was observed. As a result, no exudation was noted at all whereby it was found that the material satisfied the airtight property. Further, the transition point of this organic-inorganic hybrid glassy material, which had been allowed to stand in an atmosphere of 100° C. for 300 hours, was measured, but no change was noted whereby it was confirmed that there was no problem in terms of heat resistance as well. Still further, the obtained organic-inorganic hybrid glassy material was allowed to stand in the air for one month, but no particular change was noted whereupon it was confirmed that the material was excellent in terms of chemical durability as well.

Figure 6:
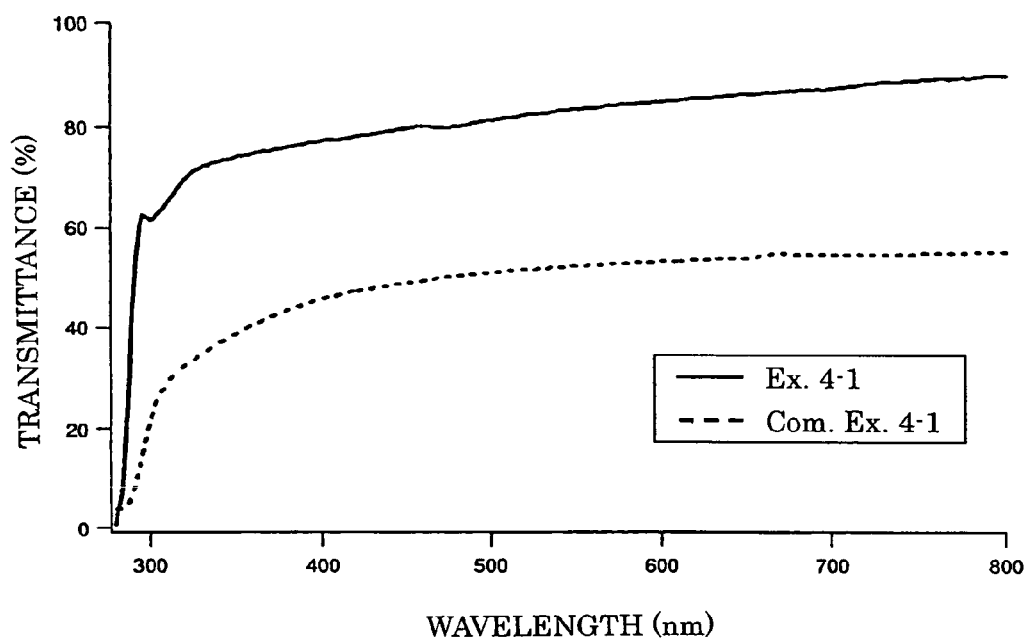
FIG. 6 shows the data of ultraviolet-visible transmission spectra as shown in Example 4-1 of the present invention and Comparative Example 4-1.

Furthermore, as shown in FIG. 6, a transmittance curve of the organic-inorganic hybrid glassy material in a wavelength region of 280 to 800 nm was measured using a Hitachi U-3500 type automatic recording spectrophotometer. The data in a solid line written in Example 4-1 correspond to this. As apparent from this result, it is understood that there is no much coloring, especially no absorption in a blue color region, which was noted until now. Incidentally, the average transmittance in wavelengths of 295 to 350 nm was 76.3% and the average transmittance in wavelengths of 350 to 800 nm was 90.9%.

EXAMPLE 4-2

Phenyltriethoxysilane (PhSi(OEt)$_3$), which is a metal alkoxide, was used as a starting material. As a mixing step, about 45 ml of water (its molar ratio to phenyltriethoxysilane was about 50), about 20 ml of ethanol (its molar ratio to phenyltriethoxysilane was about 10) and about 0.30 ml of acetic acid, which was a catalyst, (its molar ratio to phenyltriethoxysilane was about 0.1) were added to 10 ml of phenyltriethoxysilane at room temperature, followed by mixing with stirring. It was heated at 60° C. for 3 hours with stirring as a heating reaction step, then raised up to 150° C., and then melted by spending 2 hours to give a transparent material. This transparent material was dissolved in 30 ml of acetone, and 10 mg of YAG (yttrium-aluminum-garnet) were added as a fluorescent material. This solution was dried at room temperature, then aged at 150° C. for 3 hours, and then cooled down to room temperature to give a transparent material in the form of thin flakes having a thickness of 3.0 mm.

Softening temperature of this transparent material was 125° C. and was lower than the decomposing temperature of phenyl group, which is about 400° C. In view of the fact that it also had a random network structure, the transparent material, which was obtained in this time, is a material having an organic-inorganic hybrid glass structure. In other words, it is an organic-inorganic hybrid glassy material.

When this transparent material was irradiated with a light of 470 nm, a light absorption took place, and an emission was confirmed at 530 nm the visible light region.

EXAMPLE 4-3

Phenyltriethoxysilane (PhSi(OEt)$_3$), which is a metal alkoxide, was used as a starting material. As a mixing step, about 45 ml of water (its molar ratio to phenyltriethoxysilane was about 50), about 20 ml of ethanol (its molar ratio to phenyltriethoxysilane was about 10) and about 0.30 ml of acetic acid, which was a catalyst, (its molar ratio to phenyltriethoxysilane was about 0.1) were added to 10 ml of phenyltriethoxysilane at room temperature followed by mixing with stirring. It was heated at 60° C. for 3 hours with stirring as a heating reaction step, then raised up to 150° C., and then melted by spending 2 hours to give a transparent material. This transparent material was dissolved in 30 ml of acetone, and 10 mg of Rhodamine 6G were added as a coloring material. This solution was dried at room temperature, then aged at 150° C. for 3 hours, and then cooled down to room temperature to give a transparent material in the form of thin flakes having a thickness of 3.0 mm.

Softening temperature of this transparent material was 125° C. and was lower than the decomposing temperature of phenyl group, which is about 400° C. In view of the fact that it also had a random network structure, the transparent material, which was obtained in this time, is a material having an organic-inorganic hybrid glass structure. In other words, it is an organic-inorganic hybrid glassy material.

When this transparent material was irradiated with a light of 500 nm wavelength, a light absorption took place, and an emission was confirmed at 570 nm in the visible light region.

COMPARATIVE EXAMPLE 4-1

Phenyltriethoxysilane (PhSi(OEt)$_3$), which is a metal alkoxide, was used as a starting material. As a mixing step, about 3 ml of water (its molar ratio to phenyltriethoxysilane was about 3), about 20 ml of ethanol (its molar ratio to phenyltriethoxysilane was about 10) and about 0.04 ml of hydrochloric acid, which was a catalyst, (its molar ratio to phenyltriethoxysilane was about 0.01) were added to 10 ml of phenyltriethoxysilane at room temperature, followed by mixing with stirring. It was heated at 80° C. for 3 hours with stirring as a heating reaction step, then raised up to 150° C., and then melted for 1 hour and 30 minutes to give a light yellow glassy material. When this was aged at 160° C. for 5 hours and then cooled down to room temperature, the glassy material was still in the light yellow color. Incidentally, its thickness was about 1.7 mm.

Further, as shown in FIG. 6, a transmittance curve of the organic-inorganic hybrid glassy material in a wavelength region of 280 to 800 nm was measured using a Hitachi U-3500 automatic recording spectrophotometer. The data in a broken line written as Comparative Example 4-1 correspond to this. As apparent from this result, the average transmittance in wavelengths of 295 to 350 nm was 31.5% and the average transmittance in wavelengths of 350 to 800 nm was 51.3%, whereby the transmittances showed low values.

The invention claimed is:

1. A process for producing an organic-inorganic hybrid glassy material, comprising the steps of:
   (a) mixing together sol-gel starting materials;
   (b) heating a product of the mixing step to conduct a reaction of the sol-gel starting materials;
   (c) melting a product of the heating step into a melted liquid; and
   (d) aging the melted liquid into the organic-inorganic hybrid glassy material,
   wherein
   the sol-gel starting materials comprise first and second metal alkoxides as raw materials of the organic-inorganic hybrid glassy material,
   the first metal alkoxide produces a D unit in the organic-inorganic hybrid glassy material,
   the second metal alkoxide produces at least one chemical unit selected from the group consisting of $T^3$, $T^2$ and $T^1$ units in the organic-inorganic hybrid glassy material,
   so that the organic-inorganic hybrid glassy material has a ratio of D unit to (D unit+$T^3$ unit+$T^2$ unit+$T^1$ unit) from 0.05 to 0.50,
   wherein,
   the D unit is a chemical unit in which, of the four bonds which can be made to a silicon atom, excluding two bonds to which organic substituents are bonded, either both or one of the remaining bonds is bonded to another silicon atom through an oxygen atom;
   the $T^3$ unit is a chemical unit in which, of the four bonds which can be made to a silicon atom, excluding one bond to which an organic substituent is bonded, all three of the remaining bonds are bonded to other silicon atoms through oxygen atoms;
   the $T^2$ unit is a chemical unit in which, of the four bonds which can be made to a silicon atom, excluding one bond to which an organic substituent is bonded, two of the three remaining bonds are bonded to other silicon atoms through oxygen atoms, and
   the $T^1$ unit is a chemical unit in which, of the four bonds which can be made to a silicon atom, excluding one bond to which an organic substituent is bonded, one of the three remaining bonds is bonded to another silicon atom through an oxygen atom.

2. The process for producing an organic-inorganic hybrid glassy material according to claim 1, wherein the sol-gel starting materials of the mixing step comprise a compound containing a phenyl group.

3. The process for producing an organic-inorganic hybrid glassy material according to claim 1, wherein the heating step is carried out at a temperature of 40° C. to 100° C.

4. The process for producing an organic-inorganic hybrid glassy material according to claim 1, wherein the melting step is carried out at a temperature of 30° C. to 400° C.

5. The process for producing an organic-inorganic hybrid glassy material according to claim 1, wherein the aging step is carried out at a temperature of 30° C. to 400° C. for 5 minutes or longer under a pressure of not higher than 0.1 Torr.

6. The process for producing an organic-inorganic hybrid glassy material according to claim 1, wherein the first metal alkoxide is a crystalline or liquid material selected from diethoxydiphenylsilane, diethoxydimethylsilane, diethoxydiethylsilane and diethoxymethylphenylsilane.

7. The process for producing an organic-inorganic hybrid glassy material according to claim 1, wherein the second metal alkoxide is selected from phenyltriethoxysilane, methyltriethoxysilane and ethyltriethoxysilane.

8. The process for producing an organic-inorganic hybrid glassy material according to claim 1, wherein the D unit is produced in the heating step and/or the melting step.

9. The process for producing an organic-inorganic hybrid glassy material according to claim 1, wherein the sol-gel starting materials comprise more than two metal alkoxides as raw materials of the organic-inorganic hybrid glassy material.

* * * * *